United States Patent
Gupta

(10) Patent No.: US 7,955,424 B2
(45) Date of Patent: Jun. 7, 2011

(54) SYSTEM AND METHOD TO MAKE A FUEL TANK INERT

(75) Inventor: Alankar Gupta, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 267 days.

(21) Appl. No.: 12/372,989

(22) Filed: Feb. 18, 2009

(65) Prior Publication Data

US 2010/0108811 A1    May 6, 2010

Related U.S. Application Data

(63) Continuation-in-part of application No. 12/261,880, filed on Oct. 30, 2008.

(51) Int. Cl.
*B01D 53/02* (2006.01)

(52) U.S. Cl. .................. 96/108; 220/88.3; 244/129.2

(58) Field of Classification Search .............. 95/288; 96/108, 417, 420, 421; 220/88.3; 244/129.2
See application file for complete search history.

(56) References Cited

U.S. PATENT DOCUMENTS

| | | | |
|---|---|---|---|
| 4,378,920 A | 4/1983 | Runnels et al. | |
| 6,136,267 A | 10/2000 | Bergman | |
| 6,343,465 B1 | 2/2002 | Martinov | |
| 6,820,659 B2 | 11/2004 | Sauer | |
| 6,843,269 B2 * | 1/2005 | Verma et al. | 137/209 |
| 7,007,893 B2 | 3/2006 | Loss et al. | |
| 7,152,635 B2 | 12/2006 | Moravec et al. | |
| 7,191,983 B2 | 3/2007 | Loss et al. | |
| 7,204,868 B2 | 4/2007 | Snow, Jr. | |
| 7,306,646 B2 | 12/2007 | Wong | |
| 2008/0099618 A1 | 5/2008 | Zaki et al. | |
| 2008/0187785 A1 | 8/2008 | Kwok | |

* cited by examiner

*Primary Examiner* — Robert A Hopkins
(74) *Attorney, Agent, or Firm* — Armstrong Teasdale LLP

(57) ABSTRACT

A fuel tank safety system includes an ullage cooling assembly and a system controller. The ullage cooling assembly includes a compressor configured to extract a quantity of ullage gas from the fuel tank, a heat exchanger coupled in flow communication downstream of the compressor, wherein the heat exchanger is configured to receive the quantity of ullage gas from the compressor and reduce a temperature of the ullage gas. The ullage cooling assembly includes a turbine coupled in flow communication downstream of the heat exchanger, wherein the turbine is configured to further reduce the temperature of the ullage gas and facilitate channeling the ullage gas to the fuel tank. The system controller is operatively coupled to the ullage cooling assembly and is configured to transmit to the ullage cooling assembly one of a start signal to activate the ullage cooling assembly or a stop signal to deactivate the ullage cooling assembly.

17 Claims, 15 Drawing Sheets

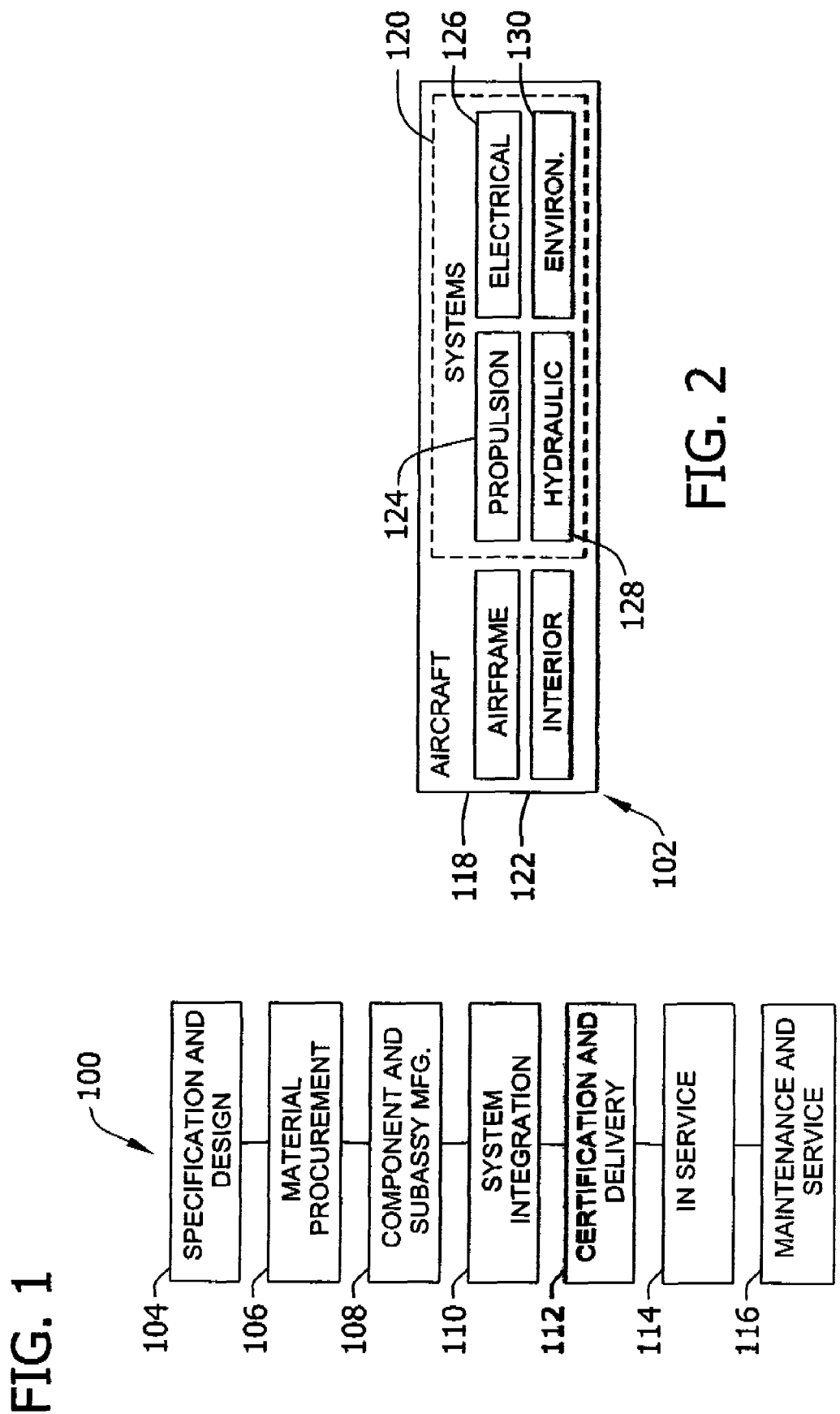

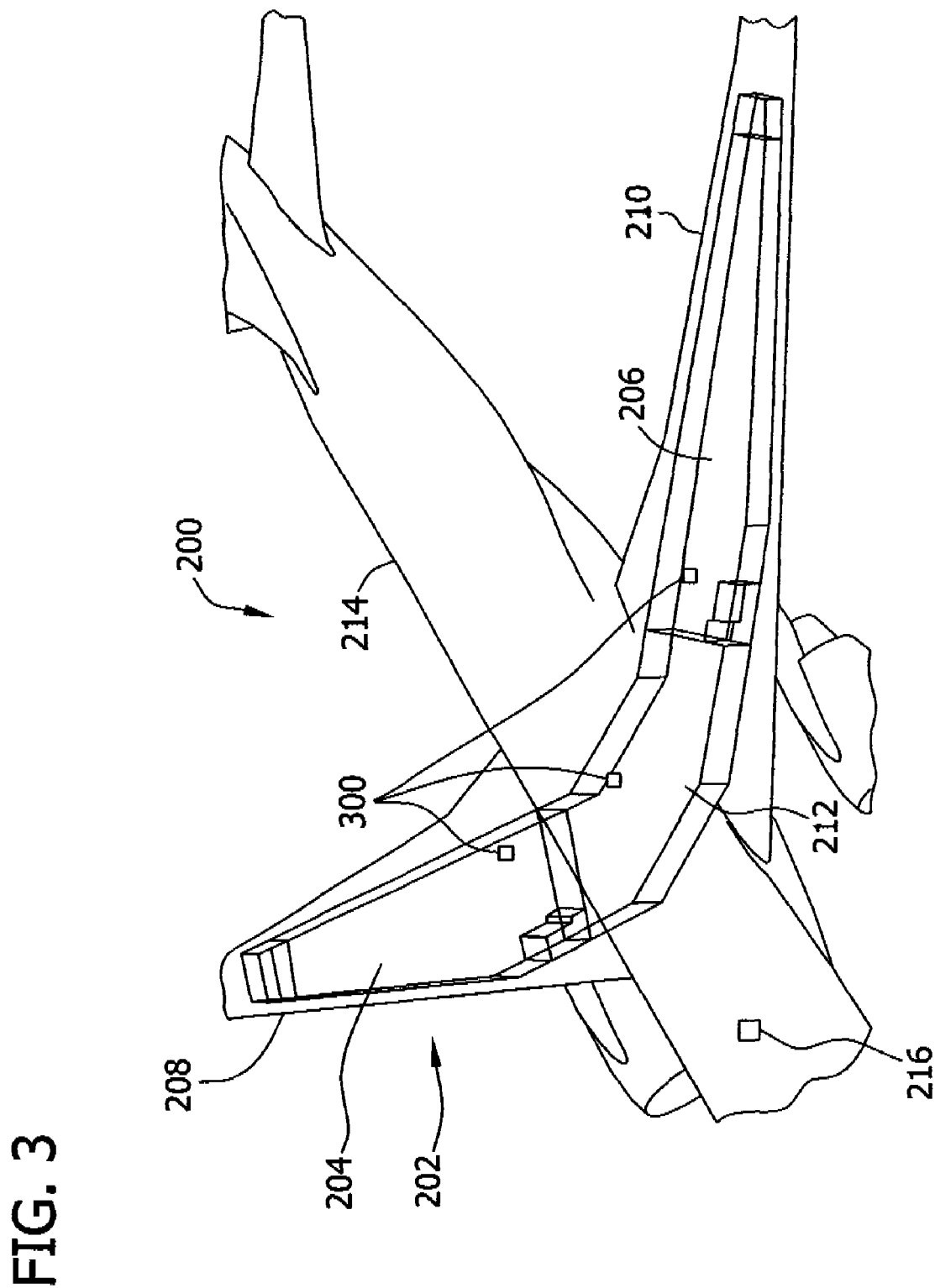

SYSTEM AND METHOD TO MAKE A FUEL TANK INERT

CROSS REFERENCE TO RELATED APPLICATIONS

This application is a continuation-in-part application of U.S. application Ser. No. 12/261,880 filed Oct. 30, 2008 and entitled "System and Method to Make a Fuel Tank Inert", the disclosures of which are hereby incorporated herein by reference in their entirety.

BACKGROUND

The field of the disclosure relates generally to fuel systems and, more particularly, to methods and systems for enhancing fuel tank safety.

Some known fuel tanks have a liquid fuel containing region that typically holds fuel and an ullage region that typically contains a mixture of air and evaporated fuel (i.e. fuel vapor) that defines an fuel/air ratio within the ullage. Ignition of the fuel/air mixture within the ullage may occur, in the presence of an ignition source, when the concentration of fuel vapors (i.e. fuel/air ratio) in the ullage lies within a certain range, commonly known as a combustion supporting range, an unsafe region or a non-inert region. More specifically, the lower flammability limit of the ullage is defined as a threshold below which the fuel/air ratio is too lean and will not ignite. Additionally, the upper flammability limit of the ullage is defined as the threshold above which the fuel vapor/air mixture is too rich to ignite. The lower limit represents the minimum fuel vapor/air mixture concentration that will ignite, while the upper limit represents the maximum fuel vapor/air mixture concentration that will support combustion. A combustion supporting region for a fuel/air mixture is defined between the lower limit concentration and the upper limit concentration. The mixture generally is not combustible outside of this region.

Under typical operating conditions, for example temperatures less than 100° F. at sea level, the fuel/air mixture concentration for Jet A fuel lies outside of the inert region and therefore is generally not combustible. However, there are a number of known events that may cause the inert fuel/air mixture within the ullage region of the fuel tank to enter the unsafe region. These circumstances may include, for example, a rapid reduction in tank ullage pressure after take off, i.e. when the aircraft reaches a high altitude in a short time when the fuel is still at the temperature that existed at take-off (for example, 98° F.). This may cause the ullage fuel vapor/air mixture concentration to enter the unsafe region at the higher altitude.

Recent Federal Aviation Administration (FAA) Regulations require that new transport aircraft include systems for enhancing the safety of aircraft fuel tanks. One known system for increasing the reliability of aircraft fuel tanks is to utilize an "inerting system" that channels an inert gas, such as nitrogen, into the fuel tank to reduce the oxygen concentration therein. The inert gas may be generated on-board using, for example, high pressure bleed air from an engine compressor or an auxiliary power unit compressor. In either case, the high pressure air flows through equipment that removes contaminants and moisture, and conditions the air to pressures and temperatures required by the air separation modules that separate the air into an oxygen-rich component that is exhausted from the aircraft and an oxygen-depleted or inert gas component that flows into the fuel tank. Such a system is expensive to install on an aircraft, significantly increases the weight of the vehicle, and also may not be reliable during operation. Inerting systems, in general, vent fuel vapor-laden ullage gases to the outside ambient when supplying oxygen-depleted or inert gas to the fuel tank. Additionally, aircraft descent rate may impact inerting system design, wherein a high descent rate may impact inert gas flow in order to limit or prevent outside air from entering the fuel tank and maintain the inert state of the fuel tank. This may require large quantities of bleed air to be channeled to the on-board inert gas generating system.

Another known system for enhancing the safety of a fuel tank is to maintain the fuel tank at a relatively low temperature that facilitates preventing fuel vaporization and hence formation of fuel vapors in the fuel tank. One known method for doing so involves using an air conditioning system to displace warm air surrounding the fuel tank.

SUMMARY

One aspect is directed to a fuel tank safety system that includes an ullage cooling assembly and a system controller. The ullage cooling assembly is coupled in flow communication with a vehicle fuel tank, wherein the fuel tank includes a fuel region containing a quantity of fuel, and an ullage region containing a quantity of ullage gas. The ullage cooling assembly includes a compressor configured to extract a quantity of ullage gas from the vehicle fuel tank, a heat exchanger coupled in flow communication downstream of the compressor, wherein the heat exchanger is configured to receive the quantity of ullage gas from the compressor and reduce a temperature of the ullage gas. The ullage cooling assembly includes a turbine coupled in flow communication downstream of the heat exchanger, wherein the turbine is configured to further reduce the temperature of the ullage gas and facilitate channeling the ullage gas to the fuel tank. The system controller is operatively coupled to the ullage cooling assembly and is configured to transmit to the ullage cooling assembly one of a start signal to activate the ullage cooling assembly or a stop signal to deactivate the ullage cooling assembly.

Another aspect is directed to a vehicle that includes a fuel tank having a fuel region containing a quantity of fuel, and an ullage region containing a quantity of ullage gas. The vehicle includes a fuel tank safety system operatively coupled to the fuel tank, wherein the fuel tank safety system includes an ullage cooling assembly and a system controller. The ullage cooling assembly is coupled in flow communication with a vehicle fuel tank, wherein the fuel tank includes a fuel region containing a quantity of fuel, and an ullage region containing a quantity of ullage gas. The ullage cooling assembly includes a compressor configured to extract a quantity of ullage gas from the vehicle fuel tank, a heat exchanger coupled in flow communication downstream of the compressor, wherein the heat exchanger is configured to receive the quantity of ullage gas from the compressor and reduce a temperature of the ullage gas. The ullage cooling assembly includes a turbine coupled in flow communication downstream of the heat exchanger, wherein the turbine is configured to further reduce the temperature of the ullage gas and facilitate channeling the ullage gas to the fuel tank. The system controller is operatively coupled to the ullage cooling assembly and is configured to transmit to the ullage cooling assembly one of a start signal to activate the ullage cooling assembly or a stop signal to deactivate the ullage cooling assembly Yet another aspect is directed to a method for making a fuel tank inert that includes channeling a quantity of ullage gas from the fuel tank, reducing a temperature of the extracted quantity of ullage gas, and returning the reduced temperature ullage gas into the fuel tank.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 1 is a flow diagram of an exemplary aircraft production and service methodology.

FIG. 2 is a system block diagram of the aircraft shown in FIG. 1.

FIG. 3 is an internal perspective view of an exemplary aircraft with an exemplary aircraft fuel system.

DETAILED DESCRIPTION

Figure 4:
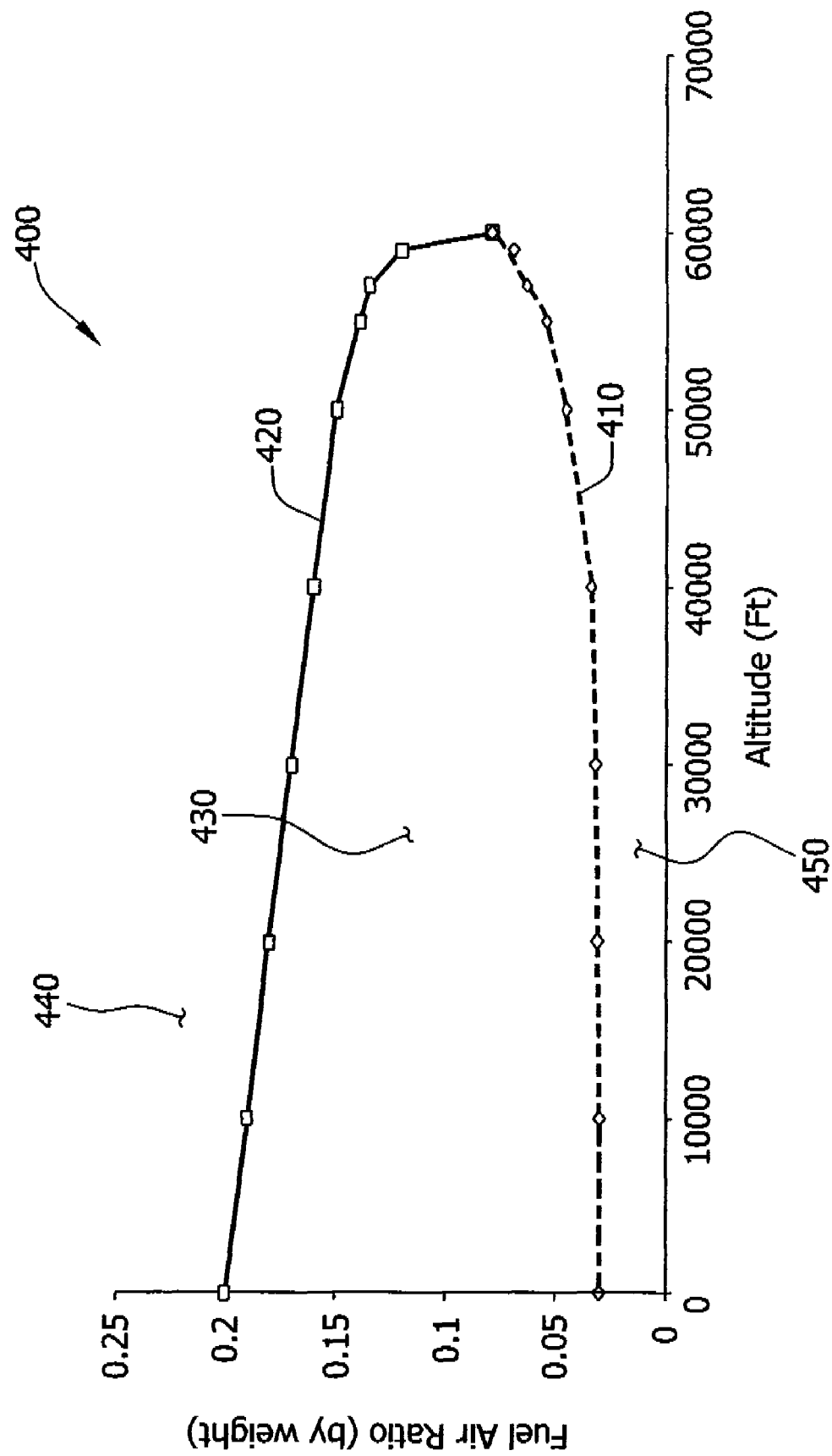
FIG. 4 is a graph illustrating a fuel/air ratio of the non-inert region as a function of altitude for an exemplary fuel used to power the exemplary aircraft shown in FIG. 3.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

FIG. 3 is an internal perspective view of an aircraft 200 that includes an exemplary aircraft fuel system 202. Aircraft fuel system 202 includes a first fuel tank 204 and a second fuel tank 206 positioned proximate to respective wings 208, 210 of aircraft 200, and a center fuel tank 212 positioned within an aircraft fuselage 214. Alternatively, aircraft 200 may have any fuel tank configuration to allow aircraft 200 to function as described herein. In the exemplary embodiment, first fuel tank 204, second fuel tank 206 and center fuel tank 212 each include an exemplary inerting system 300 for use in maintaining a quantity of fuel and ullage within each fuel tank at a "safe temperature", as described in more detail herein. Alternatively, a single inerting system 300 may be used for all fuel tanks 204, 206, 212 aboard aircraft 200. Aircraft 200 includes a vehicle processor 216 that is programmed with flight data and applicable environmental conditions, such as for example, ambient pressure conditions, as is described in more detail herein.

As provided herein, a "safe temperature" is a temperature at or below which the ullage of the fuel tank in contact with fuel is inert considering all probable operational effects. Safe temperatures may also be temperatures at or below which fuels are incapable of generating non-inert fuel/air ratios. Safe temperatures are generally equal to or less than a fuel lower flammability limit (LFL) temperatures, as described herein. Safe temperatures lower than LFL temperatures may be selected to provide "higher" level of safety, to account for factors such as fuel tank fuel mass loading, fuel sloshing, for fuel composition variability, dissolved oxygen, etc., or any other factor that may influence fuel tank safety.

Figure 5:
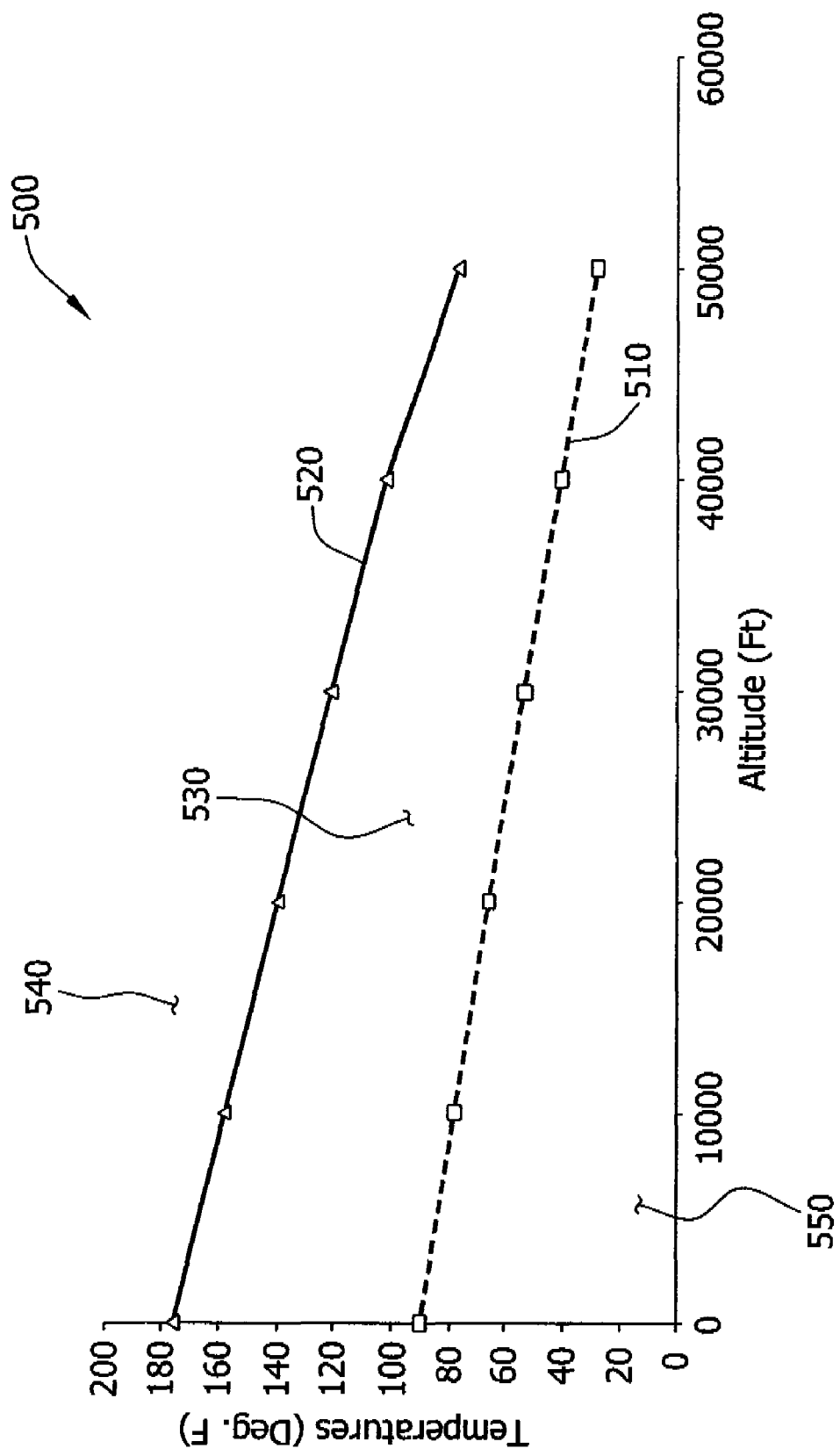
FIG. 5 is a graph illustrating the non-inert region in term so of temperature as a function of the altitude for an exemplary fuel used to power the exemplary aircraft shown in FIG. 3.

FIG. 4 is a graph 400 illustrating a fuel/air ratio of the non-inert region as a function of altitude for an exemplary fuel used to power exemplary aircraft 200 shown in FIG. 3. FIG. 5 is a graph 500 illustrating the non-inert region in terms of fuel temperature as a function of altitude for ullage in thermal equilibrium with liquid fuel in the tank. FIG. 4 shows a lower (or lean) flammability limit (LFL) 410, and an upper (or rich) flammability limit (UFL) 420 for an exemplary fuel tank. In the exemplary embodiment, an ullage gas in thermal equilibrium with liquid fuel is only non-inert within a defined fuel-air ratio region 430. More specifically and as shown in FIG. 4, ullage gas is inert when the fuel-air ratio is greater than the UFL, illustrated in region 440, and when the fuel-air ratio is less than the LFL, illustrated in region 450. Similarly, FIG. 5 shows a lower (or lean) flammability limit (LFL) 510, and an upper (or rich) flammability limit (UFL) 520 for an exemplary fuel tank. In the exemplary embodiment, an ullage gas is non-inert within a defined temperature region 530. More specifically and as shown in FIG. 5, ullage gas is inert when the temperature is greater than the UFL, illustrated in region 540, and when the temperature is less than the LFL, illustrated in region 550.

Figure 6:
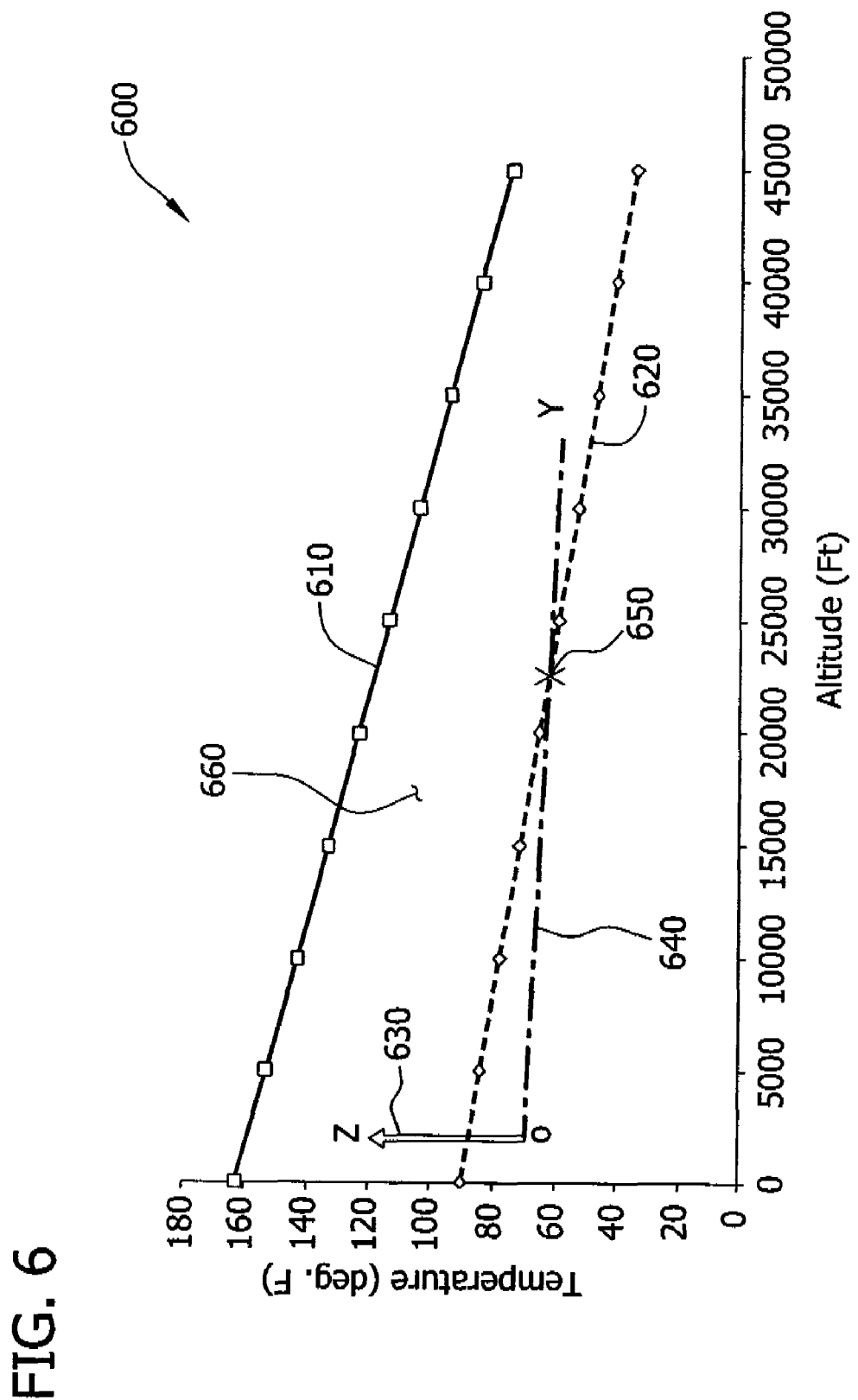
FIG. 6 is a graph illustrating the non-inert region in terms of fuel temperature as a function of the altitude for an exemplary fuel tank inert system used on the exemplary aircraft shown in FIG. 3.

FIG. 6 is a graph 600 illustrating the UFL 610 and LFL 620 for an exemplary fuel. In the exemplary embodiment, there are two circumstances illustrated wherein a fuel tank may become non-inert under operational conditions. In the first instance, the fuel tank may become non-inert during heating of the fuel tank caused by internal or external heat sources 630. The fuel tank ullage is initially inert, at conditions denoted by point O, at a temperature of approximately 70° F., and at an altitude of 2,000 feet (ft) (i.e., field altitude). Fuel may become non-inert under certain conditions, for example, when the fuel tank is heated 630 by internal or external sources (line OZ), such as when the ullage enters the non-inert region 660 region as the fuel/air ratio increases upon heating of the fuel or fuel tank.

Additionally, while the fuel tank that is generally in an inert condition at takeoff, as described herein, fuel tank may become non-inert if the fuel tank is unable to dissipate internal heat as the airplane climbs and as the fuel tank pressure decreases, shown as line 640. The characteristic line 640 crosses the LFL 620 at approximately 23,500 feet 650 and the ullage characteristics falls within the non-inerting region 660. The ullage becomes non-inert, as shown in FIG. 6, because fuel vapor/air mixtures may ignite at high altitudes in the presence of an ignition source. The above processes (heating 630 and/or insufficient heat dissipation during climb 640) by which the ullage becomes non-inert are reversible. That is a fuel tank that is initially non-inert can be rendered inert by cooling and/or by pressurization.

Figure 7:
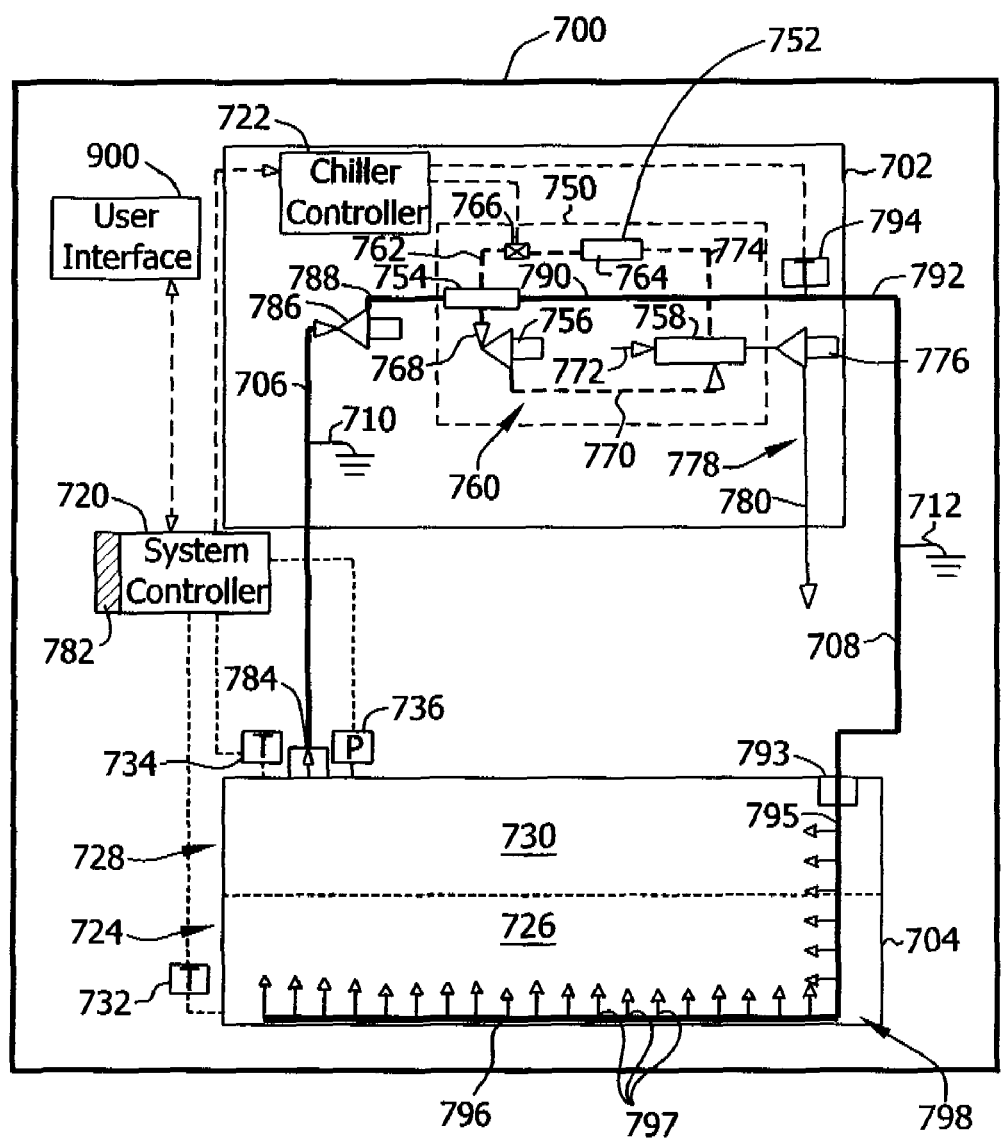
FIG. 7 is a schematic illustration of an exemplary system used to make the exemplary fuel tank inert, such as the fuel tank on the exemplary aircraft shown in FIG. 3.

FIG. 7 is a schematic illustration of an exemplary system 700 used on exemplary aircraft 200 shown in FIG. 3. System 700 is one exemplary embodiment of system 300 shown in FIG. 3. In the exemplary embodiment, system 700 includes a chiller assembly 702 coupled in flow communication with a vehicle fuel tank 704 via an inlet conduit 706 and an outlet conduit 708. Inlet conduit 706 is electrically grounded via a grounding strap 710. Similarly, outlet conduit 708 is electrically grounded via a grounding strap 712. Each ground 710, 712 facilitates preventing a build up of static electricity within system 700. In the exemplary embodiment, system 700 includes a system controller 720 communicatively coupled to chiller assembly 702, and more specifically, to a chiller controller 722 that operates chiller assembly 702, as described in more detail below.

Fuel tank 704 includes a fuel region 724 that contains a quantity of fuel 726, and an ullage region 728 that contains a mixture of fuel and air 730 (referred to herein as "ullage gas"). In the exemplary embodiment, fuel tank 704 includes a fuel temperature sensor 732 communicatively coupled to system controller 720 and positioned within fuel tank 704 to measure a temperature of the fuel 726 and transmit that measurement to system controller 720. Similarly, and in the exemplary embodiment, fuel tank 704 includes an ullage temperature sensor 734 and a fuel tank pressure sensor 736 each communicatively coupled to system controller 720 and positioned to provide a respective temperature and pressure measurement of the ullage region 728 to system controller 720. Alternatively, no fuel tank pressure sensor 736 is included and alternatively an ambient pressure signal is received from a pre-programmed database aboard vehicle processor 216 shown in FIG. 3.

In the exemplary embodiment, chiller assembly 702 includes a chiller unit 750 used to reduce a temperature of a fluid, for example ullage gas 730 and/or fuel 726, extracted from fuel tank 704. In the exemplary embodiment, chiller unit 750 is a conventional refrigerant-based air chiller that includes an accumulator 752, an evaporator 754 (or heat exchanger), a compressor 756, and a heat exchanger 758 (e.g., a condenser). Alternatively, chiller unit 750 may be any device used to reduce the temperature of a fluid and that enables system 700 to function as described herein. More specifically, and in the exemplary embodiment, chiller unit 750 includes a circular, i.e. closed, flow path 760 configured such that accumulator 752 is coupled in flow communication with evaporator 754 via a conduit 762. Evaporator 754 is coupled in flow communication with compressor 756, which is coupled in flow communication with heat exchanger 758. Heat exchanger 758 is coupled in flow communication with accumulator 752.

During use, accumulator 752 is sized and oriented to store a quantity of refrigerant 764 at high pressure. Refrigerant flow through conduit 762 is controlled by a control valve 766 positioned along conduit 762. In the exemplary embodiment, when valve 766 is in an open position, refrigerant is channeled to evaporator 754 via conduit 762 and is used to reduce a temperature of a flow of fluid through evaporator 754. Compressor 756 then receives the flow of heated refrigerant from evaporator 754 via conduit 768. Compressor 756 compresses the refrigerant gas to high pressure and the pressurized refrigerant is then channeled to heat exchanger 758 via a conduit 770 and reduces a temperature of the refrigerant using a flow of cooling air 772 (as described in more detail herein), thereby changing the phase of the refrigerant flow from gaseous refrigerant to liquid refrigerant. Liquid refrigerant is then channeled to accumulator 752 via a conduit 774 for storage and/or reuse.

In the exemplary embodiment, cooling air is channeled through condenser by a cooling air fan 776. The cooling air absorbs heat from the high pressure and temperature refrigerant gas and becomes high temperature condenser exhaust-air 778 which is channeled via conduit 780 for discharge at a convenient location. In the exemplary embodiment, cooling air 772 is recycled air from aircraft cabin (not shown FIG. 7). Alternatively, cooling air 772 may be withdrawn from any convenient location ensuring its withdrawal does not compromise fire detection and suppression performance and does not adversely impact equipment and personnel. In the exemplary embodiment, conduit 780 is oriented to discharge the high temperature condenser exhaust-air 778 within the aircraft fuselage 214 (shown in FIG. 3) at a location that will not adversely impact airplane systems and equipment. Alternatively, exhaust air 778 may be exhausted at any convenient location such that inerting system 700 functions as described herein.

In the exemplary embodiment, system controller 720 includes a processor 782 that is programmed to maintain the ullage gas 730 within the inert regime, as described in more detail herein (see for example FIGS. 4-6). System controller 720 is communicatively coupled to chiller assembly 702 and transmits commands to chiller controller 722 to start and shut down chiller assembly 702 based on various environmental measurements received from sensors 732, 734, 736 positioned within fuel tank 704. More specifically, system controller 720 receives data from fuel tank pressure sensor 736 ($P_{fuel}$), ullage temperature sensor 734 ($T_{ullage}$), and fuel temperature sensor 732 ($T_{fuel}$) and determines a Safe Temperature (ST), Chiller Start Temperature ($T_{start}$), and Chiller Stop Temperature ($T_{stop}$) using fuel tank pressure ($P_{fuel}$), as described in more detail herein.

Figure 8:
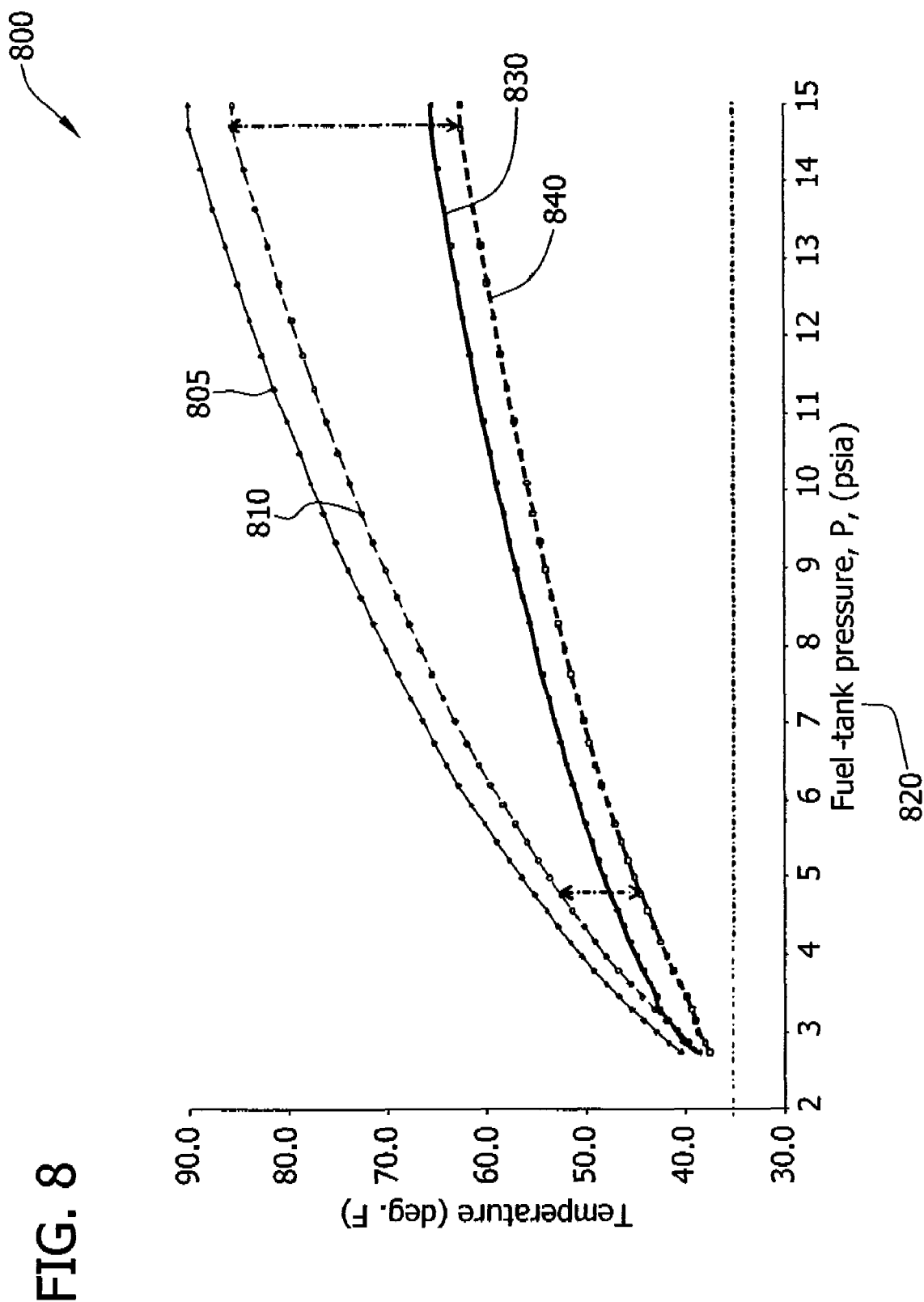
FIG. 8 is a graph illustrating system relevant temperatures as a function of fuel tank pressure for an exemplary fuel.

FIG. 8 is a graph 800 illustrating system relevant temperatures as a function of fuel tank pressure for an exemplary fuel. Graph 800 illustrates safe temperatures 810 for an exemplary fuel as a function of fuel tank pressure ($P_{fuel}$). Graph 800 illustrates the LFL 805 for reference only, to illustrate that safe temperatures have been selected that are lower that LFL 805 to account for operational parameters. In the exemplary embodiment, processor 782 is pre-programmed with safe operating temperatures (ST) 810 for an exemplary fuel. Processor determines ST based upon $P_{fuel}$, as is shown in FIG. 8, and is pre-programmed with a $T_{start}$ 830 and $T_{stop}$ 840 for the chiller assembly 702 (shown in FIG. 7). In the exemplary embodiment, the difference in temperatures $T_{start}$ 830 and $T_{stop}$ 840 represents a dead band and prevents frequent cycling of the chiller assembly 702. Processor compares $T_{ullage}$ with ST to determine whether the fuel tank safety level is within the non-inert region. System controller 720 commands chiller controller 722 to start the chiller assembly 702 when either $T_{ullage}$ or $T_{fuel}$ exceeds $T_{start}$.

More specifically, and in the exemplary embodiment, system controller 720 manages the operation of chiller assembly 702 by comparative analyses of $T_{fuel}$ and $T_{ullage}$ with chiller stop temperature $T_{stop}$ 840 and $T_{start}$ 830 using the following logic. When $T_{ullage}$ is equal to or less than $T_{stop}$ 840 AND $T_{fuel}$ is equal to or less than $T_{stop}$ 840 processor 782 generates a deactivation signal and transmits the signal to chiller controller 722 commanding shut down of chiller assembly 702. As such, chiller assembly 702 is halted when both $T_{fuel}$ AND $T_{ullage}$ are equal to or less than $T_{stop}$. When this condition is satisfied, both $T_{fuel}$ AND $T_{ullage}$ are equal to or less than $T_{stop}$ and also less than ST relative to fuel tank pressure, and therefore the ullage gas is in an inert condition. When $T_{ullage}$ is greater than $T_{start}$ OR $T_{fuel}$ is greater than $T_{start}$, system processor 782 generates a signal and transmits the signal to the chiller controller 722 commanding initiation of the cooling operations. As such, chiller assembly 702 is commanded to operate when either $T_{fuel}$ OR $T_{ullage}$ is greater than $T_{start}$.

Figure 9:
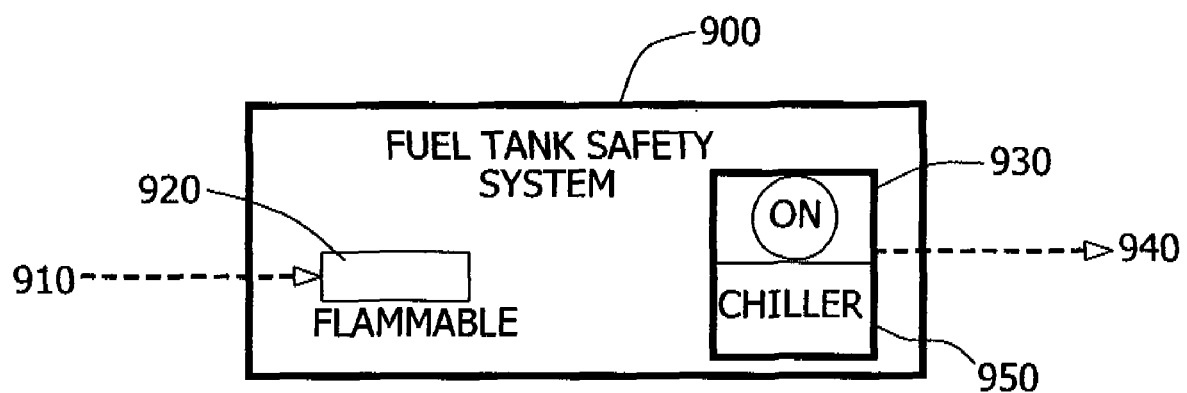
FIG. 9 is a schematic illustration of a user interface used with the system illustrated in FIG. 7.

FIG. 9 is a schematic illustration of a user interface 900 used with the inerting system 700 shown in FIG. 7. In the exemplary embodiment, processor 782 transmits a signal 910 to user interface 900 that is used to notify an operator when the ullage gas 730 is within the non-inert region, as shown in FIGS. 4-6. As described herein, to determine fuel tank inert/non-inert status, processor 782 compares $T_{ullage}$ with ST and generates signal 910 when $T_{ullage}$ is greater than ST. The above condition indicates that the fuel tank may be unsafe based on the pre-determined ST, as shown in FIG. 8. System controller 720 transmits signal 910 to user interface 900. Transmittal of signal 910 stops when $T_{ullage}$ is equal to or less than ST. The above condition indicates that fuel tank 704 is inert based on the pre-determined ST. Indicator 920, if previously illuminated, is extinguished based on an inert ullage (i.e. safe) determination. User interface includes of a manual switch 930 for manually selecting system 700. When switch 930 is in an ON position, a signal 940 is provided to system controller 720. This commands system controller 720 to operate the system and power chiller assembly 702. An advisory indicator 950 illuminates when chiller assembly 702 fails or malfunctions.

The fuel-air ratio of ullage gas 730 progressively decreases and ullage gas 730 progressively become more inert during chiller assembly 702 operations. In the exemplary embodiment, when temperature of ullage gas 730 become equal to or less than the Safe Temperature, ST, the ullage gas 730 within fuel tank 704 becomes non-combustible. The cooling process described herein continues until system controller 720 commands chiller controller 722 to shut down the chiller assembly 702.

Referring again to FIG. 7, during system operations and in the exemplary embodiment, ullage gas 730 is withdrawn from an outlet 784 of the fuel tank 704 by an electric pump 786 and ullage gas 730 is then channeled to chiller assembly 702 via conduit 706. More specifically, pump 786 is coupled in flow communication with evaporator 754 via conduit 788, and pump 786 facilitates channeling ullage gas 730 to chiller assembly 702 via conduits 706, 788. Chiller assembly 702 reduces a temperature of ullage gas 730 as described herein. Alternatively, fuel 726, or a combination of fuel 726 and ullage gas 730, may be withdrawn from fuel tank 704 and subsequently channeled through chiller assembly 702 to reduce a temperature thereof.

Fuel vapors present in ullage gas 730 flowing through the evaporator 754 condense into liquid fuel during the cooling process. The ullage gas 730 then becomes a chilled "wet" ullage mixture 790. In the exemplary embodiment, chilled "wet" ullage mixture 790 containing both liquid fuel and fuel vapors, is channeled back to the fuel tank 704 via conduit 792 and into a fuel tank inlet 793. A temperature sensor 794 continuously monitors the temperature of chilled "wet" ullage mixture 790 that is channeled from evaporator 754. Temperature sensor 794 is communicatively coupled to chiller controller 722 and provides the measured temperatures thereto. Chiller controller commands valve 766 to provide refrigerant 764 to evaporator 754 to maintain a temperature of the "wet" ullage mixture 790 such that temperature sensed by temperature sensor 794 is at the design evaporator discharge temperature $T_{evap}$.

An internal fuel tank conduit 795 is connected to a discharge element 796 that includes plurality of openings 797 for introducing the "wet" ullage mixture 790 into fuel 726. In the exemplary embodiment, internal conduit 795 has multiple openings to discharge some of "wet" ullage mixture into the ullage region 728 and the fuel region 724. The discharged "wet" ullage mixture in the ullage region cools the ullage gas 730. $T_{ullage}$ is reduced by mixing with the returning chilled "wet" ullage mixture 790. In the exemplary embodiment, discharge element 796 is located near a bottom portion 798 of fuel tank 704. The discharged "wet" ullage mixture 790 bubbles through liquid fuel 726 and $T_{fuel}$ is subsequently reduced by the chilled "wet" ullage mixture 790. System 700 uses chiller assembly 702 to remove heat from fuel tank 704 at a rate greater than the rate at which heat enters the fuel tank 704. Alternatively, "wet" ullage mixture 790 may be introduced into fuel tank 704 in any method that enables system 700 to function as described herein.

In an alternate embodiment of system shown in FIG. 7, fuel temperature sensor 732 is deleted. The system controller 720 controls the operation of chiller assembly 702 by comparative analyses of $T_{ullage}$ with $T_{stop}$ 840 and $T_{start}$ 830 using the following logic. When $T_{ullage}$ is equal to or less than $T_{stop}$ 840, processor 782 generates a deactivation signal and transmits the signal to chiller controller 722 commanding shut down of chiller assembly 702. As such, chiller assembly 702 is halted when $T_{ullage}$ is equal to or less than $T_{stop}$. When this condition is satisfied $T_{ullage}$ is equal to or less than $T_{stop}$ and also less than ST relative to fuel tank pressure, and therefore the ullage gas is in an inert condition. When $T_{ullage}$ is greater than $T_{start}$, system processor 782 generates a signal and transmits the signal to the chiller controller 722 commanding initiation of the cooling operations. As such, chiller assembly 702 is commanded to operate when $T_{ullage}$ is greater than $T_{start}$.

In an alternate embodiment of the exemplary embodiment shown in FIG. 7 and the alternate embodiment discussed above internal fuel tank conduit 795 and discharge element 796 are deleted and the "wet" ullage mixture is discharged directly into the ullage region 728. The discharged "wet" ullage mixture cools the ullage gas 730. $T_{ullage}$ is reduced by mixing with the returning chilled "wet" ullage mixture 790. The ullage gas in turn cools liquid fuel 726 and $T_{fuel}$ is subsequently reduced.

Figure 10:
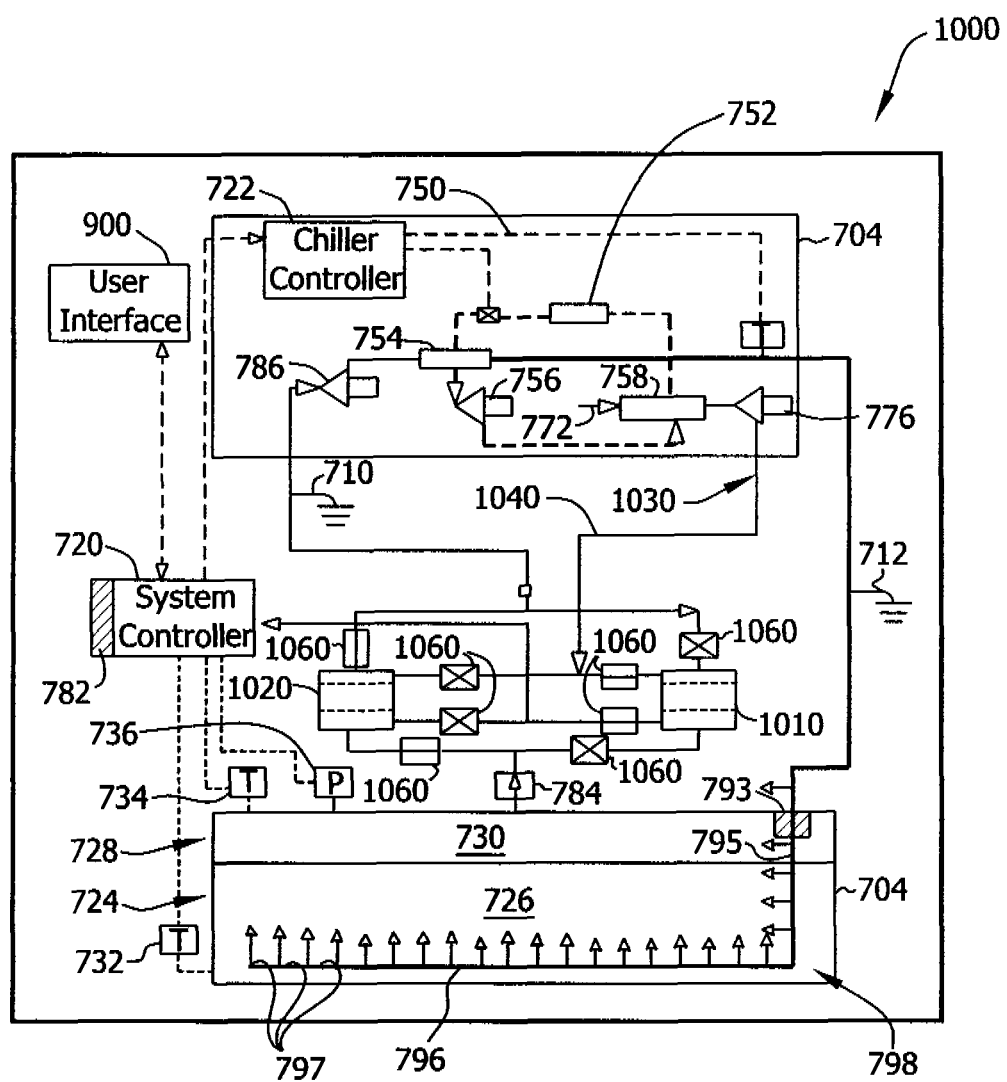
FIG. 10 is a schematic illustration of an alternative system used to make the fuel tank inert.

FIG. 10 is a schematic illustration of an alternative embodiment of a system 1000 used to make a fuel tank inert. The operation of this illustrated embodiment, shown in FIG. 10, is similar to the embodiment shown in FIG. 7 and described herein, and similar to alternative embodiments discussed herein. Therefore, like components are similarly numbered therein. System 1000 is similar to system 700, but may additionally incorporate a plurality of adsorbers 1010, 1020 (e.g., activated charcoal) to remove fuel vapors from the extracted ullage gas 730. FIG. 10 shows adsorber 1020 that adsorbs fuel vapors from the ullage gas flowing to chiller assembly 702. This reduces fuel-air ratio of the ullage gas that is cooled outside the fuel tank. FIG. 10 shows adsorber 1010 bring re-activated by a quantity of hot air 1030 discharged by heat exchanger 758 via conduit 1040. A timer (not shown in FIG. 10), part of system controller 720, periodically switches the operational adsorbers by opening and closing a plurality of valves 1060. During operation, adsorbers minimize fuel vapor content of ullage gas 730 flowing through the chiller assembly (i.e. equipment outside of the fuel tank).

Figure 11:
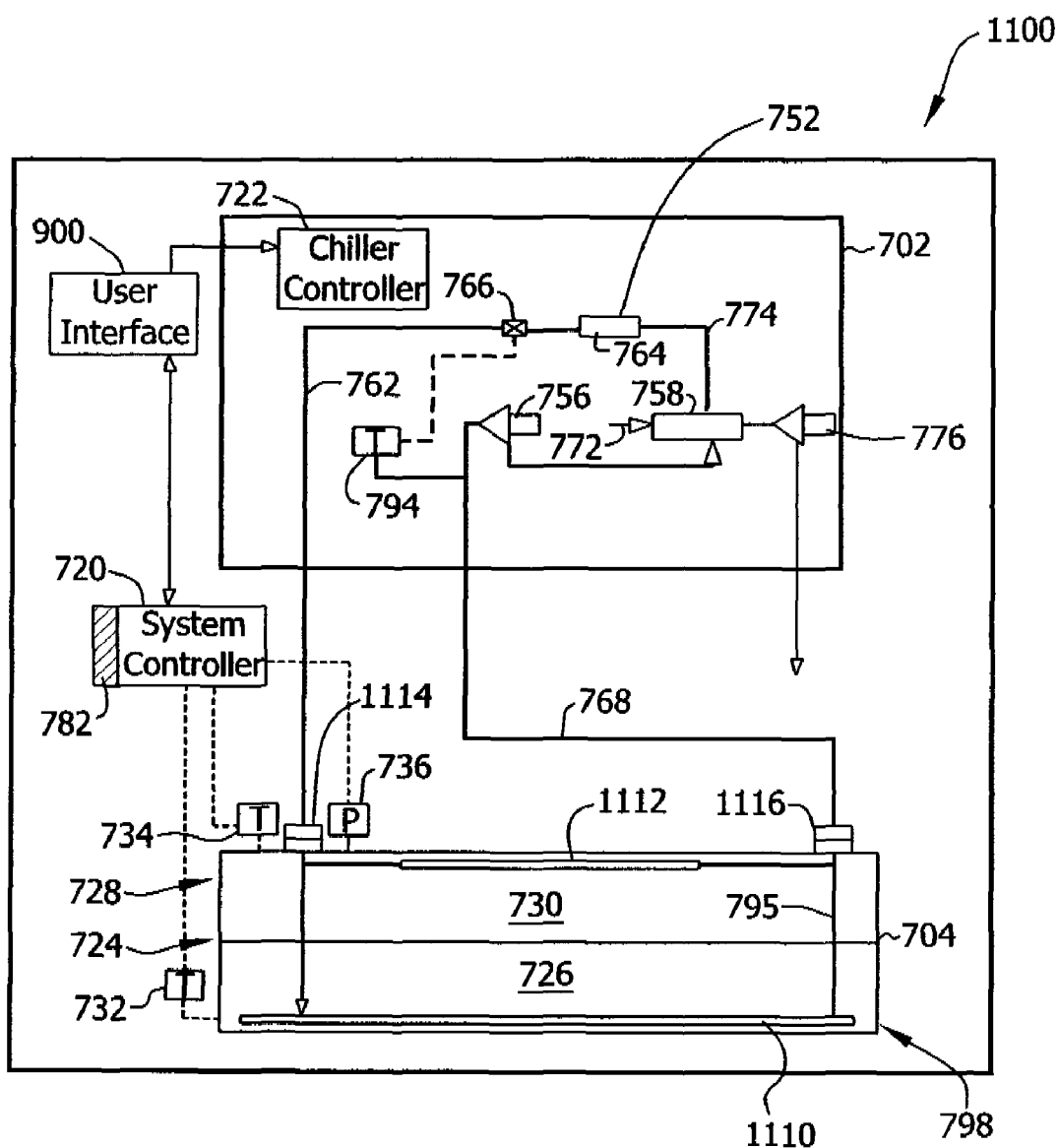
FIG. 11 is a schematic illustration of another alternative fuel tank safety system.

FIG. 11 is a schematic illustration of an alternative embodiment of a system 1100 used to make a fuel tank inert. The operation of this illustrated embodiment, shown in FIG. 11, is similar to the embodiment shown in FIG. 7 and described herein. Therefore, like components are similarly numbered therein. System 1100 is similar to the embodiment illustrated in FIG. 7, but incorporates evaporators 1110, 1112 connected in parallel. Evaporators 1110, 1112 are located respectively at the bottom 798 of the fuel tank 704, and the ullage space 730. In the illustrated embodiment, fuel 726 is directly cooled by evaporator 1110 and the ullage is directly cooled by the evaporator 1112. Temperature sensor 794 is positioned to sense temperature of refrigerant returning to the compressor 756. The sensor 794 modulates valve 766 to control a supply of refrigerant to evaporators 1110 and 1112. Refrigerant is channeled to evaporators via conduit 762 though a substantially leak-proof inlet. Moreover, refrigerant is returned to the chiller assembly 702 via conduit 768, through a substantially leak-proof outlet 1116. The refrigerant is supplied to the evaporators via conduit 762. The refrigerant is returned from the evaporators by conduit 768. Items 1114 and 1116 are disconnects used to connect/disconnect internal conduits from the external conduits.

Figure 12:
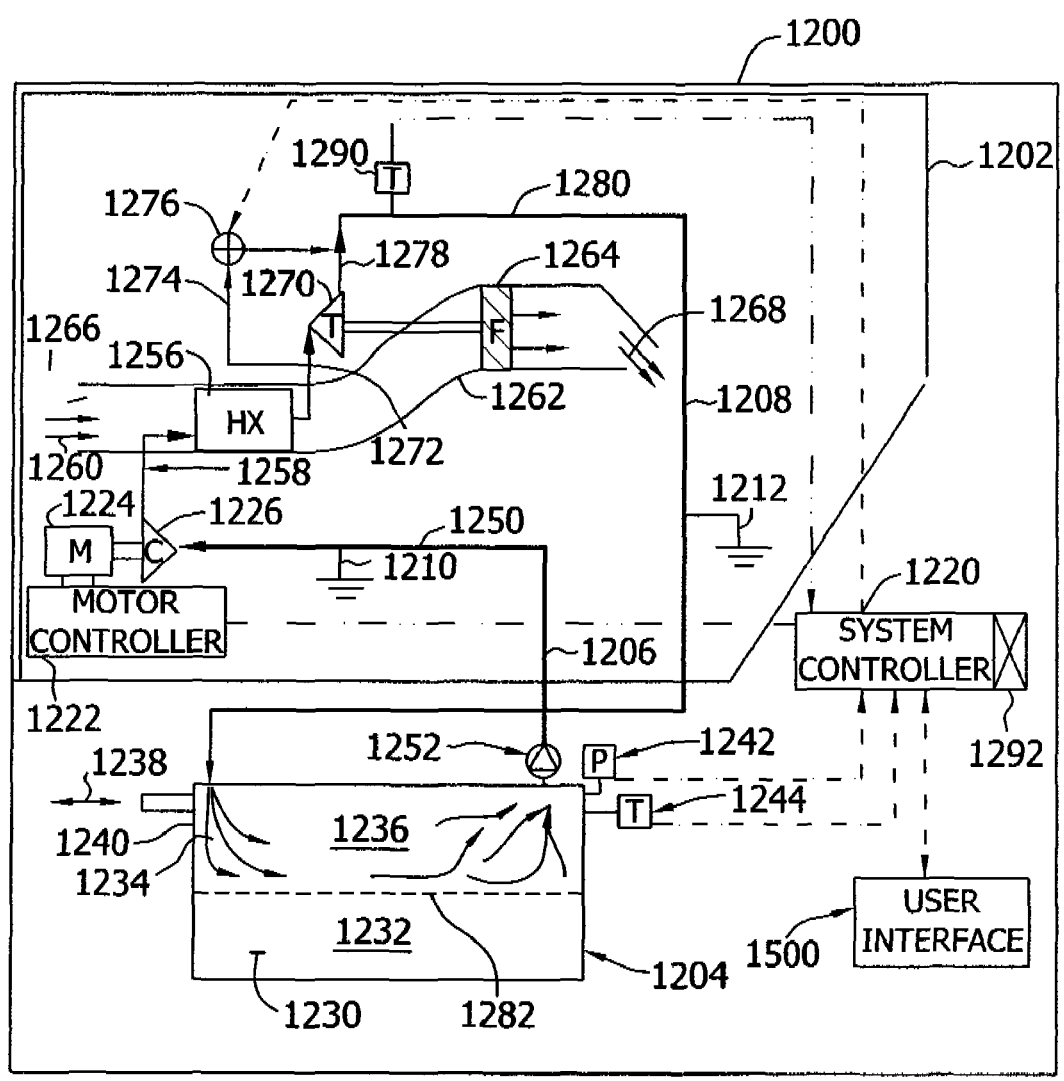
FIG. 12 is a schematic illustration of an alternative embodiment of a system used to make a fuel tank inert.

FIG. 12 is a schematic illustration of an alternative embodiment of a system 1200 used to make a fuel tank inert. In the exemplary embodiment, system 1200 includes an ullage cooling assembly (herein referred to as an ullage cooling machine (UCM)) 1202, coupled in flow communication with a vehicle fuel tank 1204 via an ullage gas suction conduit 1206 and an ullage gas return conduit 1208. In the illustrated embodiment, ullage gas suction conduit 1206 is electrically grounded via grounding strap 1210 at a single location. Similarly, ullage gas return conduit 1208 is electrically grounded via grounding strap 1212 at a single location. Alternatively, conduits 1206 and 1208 may be grounded by any number of respective grounding straps 1210 and 1212 that enable system 1200 to function as described herein. A plurality of grounding straps (not shown), similar to grounding straps 1210 and/or 1212 may be coupled to UCM 1202 to prevent build up of static electricity. During operation, grounding straps 1210 and 1212 that are coupled to conduits 1206 and 1208 and to UCM 1202 to substantially prevent a build up of static electricity within system 1200.

In the illustrated embodiment, system 1200 includes a system controller 1220 communicatively coupled to UCM 1202, and more specifically, to the motor controller 1222 that controls the operation of an electric motor 1224 that drives a compressor 1226 within UCM 1202, as described in more detail herein.

In the illustrated embodiment, fuel tank 1204 includes a fuel region 1230 that contains a quantity of fuel 1232, and an ullage region 1234 that contains a mixture of fuel vapor and air mixture 1236 (referred to herein as "ullage gas"). Fuel region 1230 decreases in volume and ullage region 1234 increases in volume as fuel 1232 is consumed during operations. In the illustrated embodiment, fuel tank 1204 is a vented tank that includes an ambient vent 1238 that extends through a wall 1240 within ullage region 1234. Vent 1238 enables outside ambient air to communicate with ullage region 1234, thereby enabling fuel tank 1204 to substantially equalize in pressure by expelling and ingesting air therethrough. In a further alternative embodiment, fuel tank 1204 is not vented.

In the exemplary embodiment, fuel tank 1204 includes a fuel tank pressure sensor 1242 and an ullage temperature sensor 1244 each communicatively coupled to system controller 1220. Sensors 1242 and 1244 provide a respective pressure and temperature measurement of ullage region 1234 to system controller 1220. In an alternative embodiment, a plurality of sensors 1242 and 1244 may be used depending on fuel tank construction. Alternatively, no fuel tank pressure sensor 1242 is included and alternatively an ambient pressure signal (not shown in FIG. 12) is received from a pre-programmed database aboard vehicle processor, e.g., aircraft air data system, if the fuel tank is vented, as described in more detail herein.

In the illustrated embodiment, UCM 1202 includes a compressor 1226 operatively coupled to, and driven by electric motor 1224. Compressor 1226 may be of any type suitable for compressing ullage gas through low pressure ratios, such as for example a pressure ratio of 2.0 to 3.0. Compressor 1226 withdraws a quantity of ullage gas 1250 from ullage region 1234 through a check valve 1252 positioned in conduit 1206. Ullage gas 1250 is compressed by compressor 1226 and is channeled to a heat exchanger 1256 via conduit 1258. During operation, compressor 1226 increases the pressure and temperature of ullage gas 1250 flowing through conduit 1206 from $P_{fuel}$, $T_{ullage}$ to higher pressure and temperature $P_{cOut}$ to $T_{cOut}$ and channels ullage gas 1250 to the heat exchanger 1256 via conduit 1258. Compressor 1226 does not alter a fuel/air ratio of ullage gas 1250 flowing through the compressor 1226, but does increase the pressure and temperature of ullage gas 1250.

In the illustrated embodiment, heat exchanger 1256 is a conventional air-to-air heat exchanger that is cooled by ambient air 1260, referred herein as cooling air. Cooling air 1260 is channeled through cooling duct 1262 by a cooling air fan 1264 that is positioned within cooling duct 1262. Cooling duct 1262 includes an inlet 1266 and an outlet 1268. In the exemplary embodiment, inlet 1266 and outlet 1268 are fixed in geometry. In alternate configuration, inlet 1266 is a variable area inlet that may be modulated open and close by a mechanism (not shown) based on a signal (e.g., from a temperature sensor and/or a air/ground switch) to enhance UCM 1202 performance. In another alternate configuration inlet 1266 and outlet 1268 may be both variable and modulated open and close by an alternate mechanism (not shown) based on a signal (e.g., a temperature sensor and/or a air/ground switch) to enhance UCM 1202 performance. Outlet 1268 may be oriented to discharge high temperature heat exchanger cooling air exhaust 1260 outside the airplane such that inerting system UCM 1202 functions as described herein.

As shown in FIG. 12 and in the exemplary embodiment, the pressure of ullage gas decreases to pressure $P_{HXout}$ due to pressure losses within heat exchanger 1256 and the temperature decreases to $T_{HXout}$ due to cooling realized within heat exchanger 1256. A quantity of the fuel vapors present in the ullage gas 1250 may condense as liquid fuel droplets. Ullage gas at $P_{HXout}$ and $T_{HXout}$ is channeled to a turbine 1270 via a conduit 1272. Ullage gas downstream of heat exchanger 1256 may be allowed to flow through a modulating valve 1276 positioned in conduit 1274 and communicatively coupled to system controller 1220 via conduit 1274 when valve 1276 is positioned in an open configuration by system controller 1220. The open configuration allows warm ullage gas from downstream of heat exchanger 1256 to bypass turbine 1270 and mix with cold turbine exhaust in conduit 1278 and thereby increase an exhaust temperature to a selected control temperature, $T_{control}$, as described in more detail herein.

In the exemplary embodiment, ullage gas flowing through turbine 1270 expands to low pressure. During expansion, the pressure and temperature of ullage gas decreases to $P_{Tout}$ and $T_{Tout}$. At least a portion of the fuel vapors present in the ullage gas condense as liquid fuel droplets therein. Low pressure $P_{Tout}$ and low temperature $T_{Tout}$ ullage gas with liquid fuel droplets, termed herein as chilled "wet" ullage gas 1280, is channeled into conduit 1208. Conduit 1208 channels chilled "wet" ullage gas 1280 to ullage region 1234 of fuel tank 1204. Chilled "wet" ullage gas 1280 blows over an exposed surface 1282 of fuel 1232 (liquid fuel/ullage interface) and mixes with ullage gas 1236, while reducing a temperature of exposed surface 1282. Chilled "wet" ullage gas 1280 mixes with ullage gas 1236 and is again available for cooling by UMC 1202.

In the exemplary embodiment the power developed by turbine 1270 is absorbed by cooling fan 1264. Cooling fan 1264 draws cooling air 1260 through heat exchanger 1256 and exhausts the cooling air 1260 overboard through cooling air outlet 1268.

In the illustrated embodiment, system 1200 includes a temperature sensor 1290 that is communicatively coupled to system controller 1220. Sensor 1290 is positioned in conduit 1208 and substantially continuously monitors the temperature of chilled "wet" ullage gas 1280 and provides temperature data to system controller 1220. System controller 1220 modulates valve 1276 to enable warm ullage gas to flow from conduit 1274 through valve 1276 to mix with "wet" chilled ullage gas 1280. Such a configuration enables the temperature to increase to a design control temperature, $T_{control}$. System controller 1220 also compares temperature sensor 1290 data with UCM 1202 threshold temperature $T_{trip}$ settings and terminates the ullage cooling steps described herein if the temperature sensed by sensor 1290 is greater than the threshold temperature, $T_{trip}$. This prevents a malfunctioning ullage cooling machine 1202 from operating.

Figure 13:
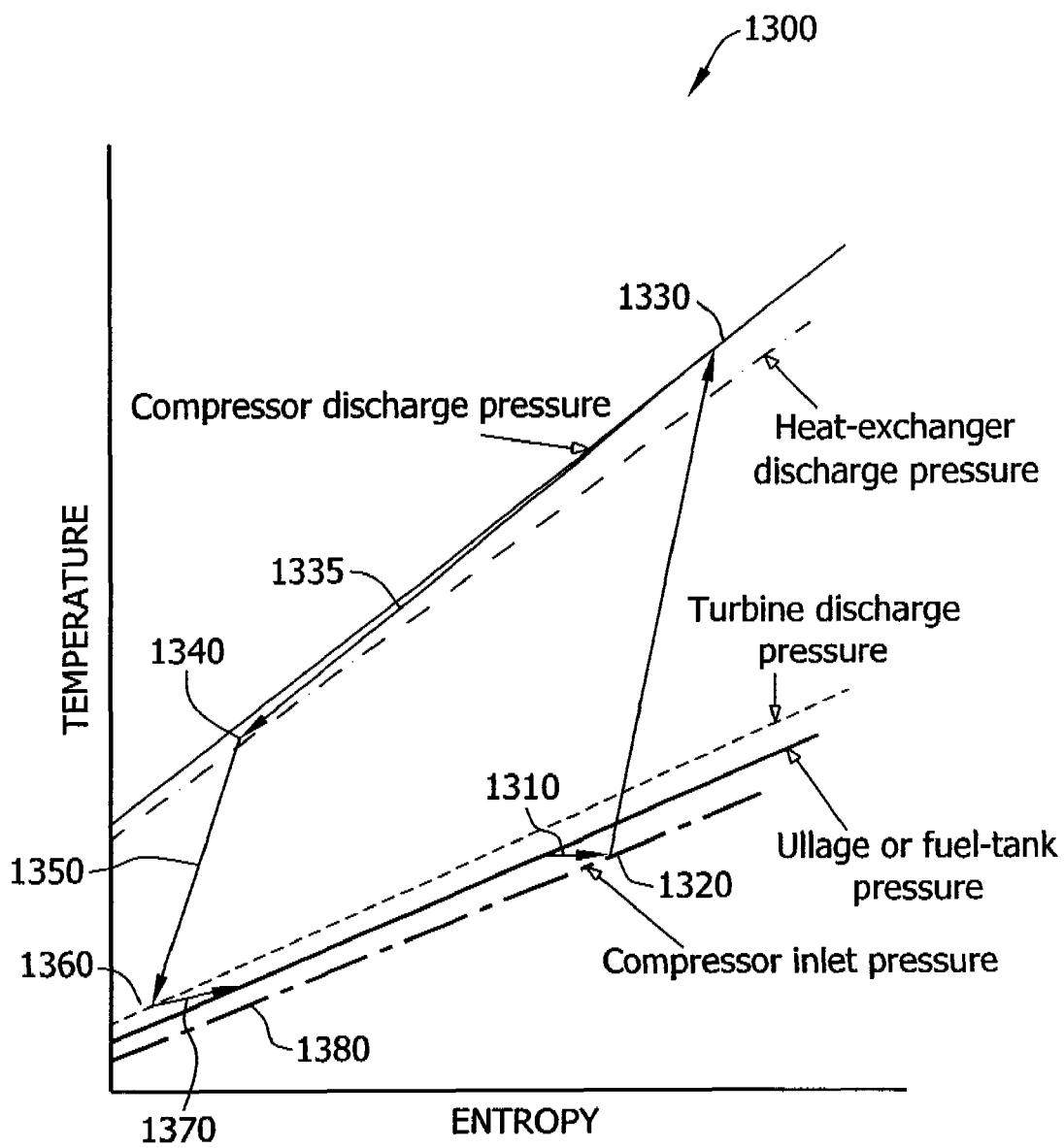
FIG. 13 is a graph illustrating a thermodynamic process of an ullage cooling machine shown in FIG. 12.

FIG. 13 is a graph 1300 illustrating a thermodynamic process of ullage cooling machine 1202 shown in FIG. 12. Compressor 1226 of UCM 1202 withdraws ullage gas 1236 from ullage region 1234 of fuel tank 1204 at conditions (pressure and temperature) denoted by state-point 1310 via conduit 1206. Pressure loss occurs across check valve 1252 and conduit 1206 and ullage gas 1250 flowing in conduit 1206 arrives at compressor 1226 at conditions shown by state-point 1320. Compressor 1226 increases a pressure of ullage gas 1250 and discharges the high pressure and temperature gas at conditions denoted by state-point 1330 in downstream conduit 1258. Characteristic line 1335 illustrates cooling in heat exchanger 1256, wherein the temperature of ullage gas 1250 decreases due to a transfer of heat to cooling air 1260 and the pressure decreases due to pressure losses in heat exchanger 1256. The heat exchanger discharge conditions are denoted by state-point 1340. During moderate temperature conditions a significant portion of ullage gas 1250 is channeled through turbine 1270 and expands to a lower pressure, illustrated by characteristic line 1350.

In the illustrated embodiment a turbine discharge temperature is shown lower than the design control temperature, $T_{control}$. The turbine discharge condition is represented by state-condition 1360. Temperature sensor 1290 sends the turbine discharge temperature data to system controller 1220 that enables a portion of warm ullage gas to bypass turbine 1270 via modulating valve 1276 and mix with turbine exhaust within conduit 1278, illustrated by characteristic line 1370. During high temperature conditions all of ullage gas 1250 flows through turbine 1270 and valve 1276 is in a closed configuration. The turbine discharge temperature is equal to or higher than the control temperature, $T_{control}$. Chilled "wet" ullage gas 1280 at conditions represented by state-point 1380 is channeled back to fuel tank 1204 via conduit 1208 at a lower temperature than the ullage gas previously withdrawn by compressor 1226. Chilled "wet" ullage gas 1280 facilitates cooling ullage 1236 and fuel 1232. Fuel tank 1204 is cooled by designing UCM 1202 to remove heat from fuel tank 1204 at a rate greater than the rate at which heat enters fuel tank 1204 and also at a rate that ensures that the ullage fuel/air ratio remains less than the non-inert fuel/air ratio at all operating conditions.

In the exemplary embodiment, cooling air is channeled through heat exchanger 1256 by a cooling air fan 1264 that is powered by turbine 1270. Cooling air 1260 absorbs heat from the high pressure and temperature ullage gas that is channeled into heat exchanger 1256 from compressor 1226 via conduit 1258. In the exemplary embodiment, cooling air 1260 is ambient air from outside the aircraft and is channeled from an outside air conduit (not shown) through inlet 1266.

In the exemplary embodiment, system controller 1220 includes a processor 1292 that is programmed to maintain ullage gas 1236 lean and within the inert regime, as described in more detail herein. System controller 1220 is communicatively coupled to UCM 1202 and transmits commands to motor controller 1222 to start and shut down compressor 1226 based on measurements received from sensors 1242 and 1244 positioned within fuel tank 1204. More specifically, system controller 1220 receives data from fuel tank pressure sensor 1242 ($P_{fuel}$) and ullage temperature sensor 1244 ($T_{ullage}$) and substantially continually determines safe temperature (ST), motor start temperature ($T_{start}$), and motor stop temperature ($T_{stop}$) using fuel tank pressure ($P_{fuel}$), as described in more detail herein.

Figure 14:
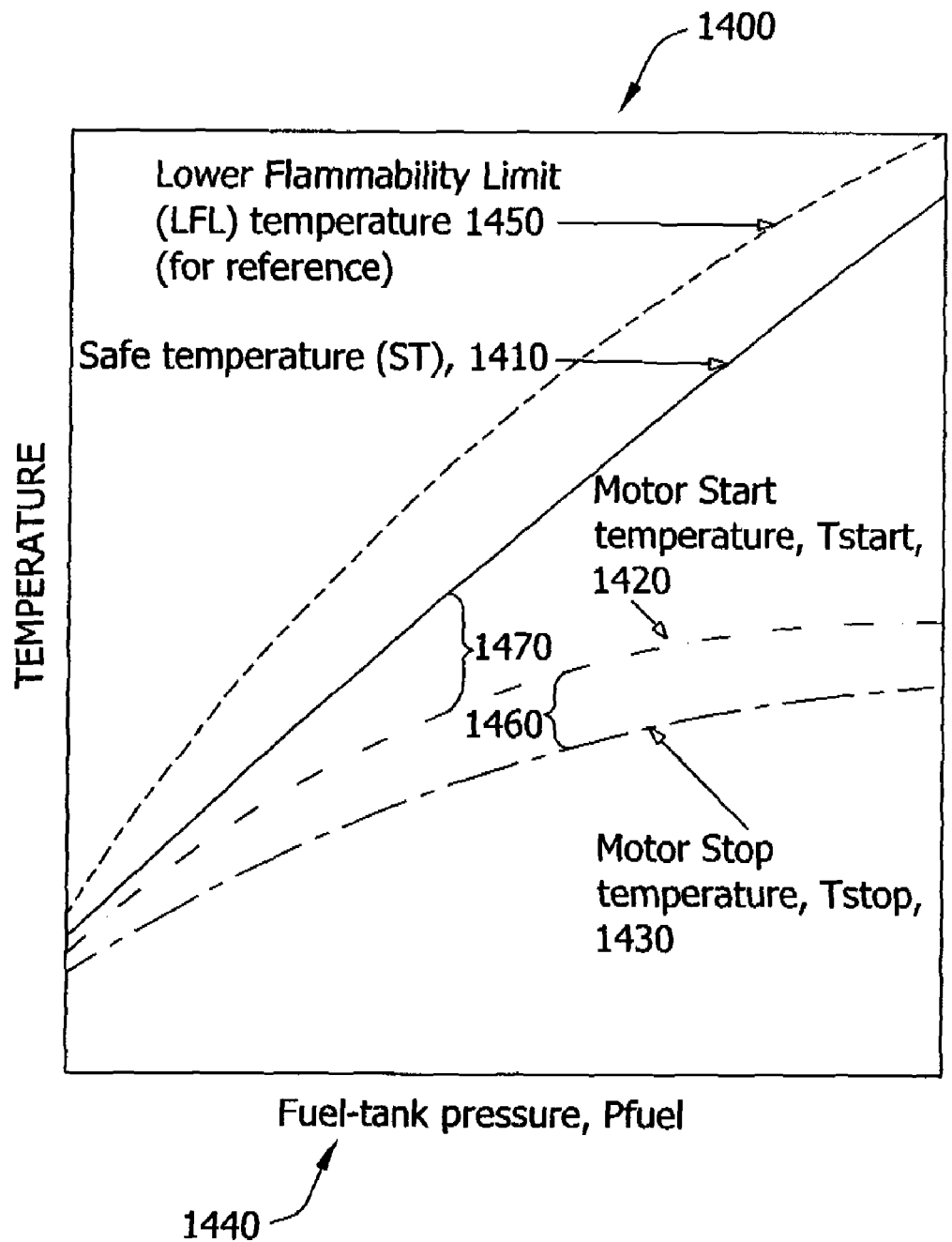
FIG. 14 is a graph illustrating safe temperature (ST), motor start temperature ($T_{start}$) and motor stop temperature ($T_{stop}$) as a function of fuel tank pressure $P_{fuel}$.

FIG. 14 is a graph 1400 illustrating safe temperature (ST) 1410, motor start temperature ($T_{start}$) 1420 and motor stop temperature ($T_{stop}$) 1430 as a function of fuel tank pressure $P_{fuel}$ 1440. Graph 1400 illustrates the lower flammability limit (LFL) temperatures 1450 for reference only, to illustrate that safe temperatures 1410 have been selected that are lower than LFL temperatures 1450 to account for operational parameters such as fuel sloshing, fuel mass loading variations, fuel age, fuel composition variations, etc. In the exemplary embodiment, processor 1292 is pre-programmed with safe operating temperatures (ST) 1410 for an exemplary fuel. Processor determines ST 1410 based upon fuel tank pressure $P_{fuel}$, as shown in FIG. 14. Processor 1292 may also be pre-programmed with motor start temperatures $T_{start}$ 1420 and motor stop temperatures $T_{stop}$ 1430 for motor 1224 of the ullage cooling machine 1202 (shown in FIG. 12). In the exemplary embodiment, a difference in temperatures $T_{start}$ 1420 and $T_{stop}$ 1430 represents a dead band 1460 and prevents frequent cycling of the motor 1224.

Processor 1292 compares ullage temperature $T_{ullage}$ measured by sensor 1244 with ST to determine whether the fuel tank ullage 1236 is within the non-inert region. System controller 1220 commands motor controller 1222 to start motor 1224 when $T_{ullage}$ exceeds $T_{start}$ 1420. More specifically, and in the exemplary embodiment, system controller 1220 manages the operation of UCM 1202 by comparative analyses of $T_{ullage}$ with motor stop temperature $T_{stop}$ 1430 and motor start $T_{start}$ 1420 using logic described herein.

When $T_{ullage}$ is equal to or less than $T_{stop}$ 1430, then processor 1292 generates a deactivation signal and transmits the signal to motor controller 1222, thereby commanding motor controller 1222 to deactivate electric motor 1224. As such, UCM 1202 halts when $T_{ullage}$ is equal to or less than $T_{stop}$. When this condition is satisfied, $T_{ullage}$ is equal to or less than $T_{stop}$ and also less than ST relative to fuel tank pressure. Therefore the ullage gas is inert.

When $T_{ullage}$ is greater than $T_{start}$ 1420 then system processor 1292 generates a signal and transmits the signal to the motor controller 1222 commanding motor controller 1222 to activate electric motor 1224. As such, UCM 1202 is commanded to operate when $T_{ullage}$ is greater than $T_{start}$. In the exemplary embodiment, motor start temperatures $T_{start}$ 1420 significantly lower than ST 1420 is selected to provide an operating margin 1470 (defined as ST minus $T_{start}$) to account for rapid changes in ST during climb and also to account for variations in ullage gas 1236 temperatures within ullage region 1234 of fuel tank 1204.

Figure 15:
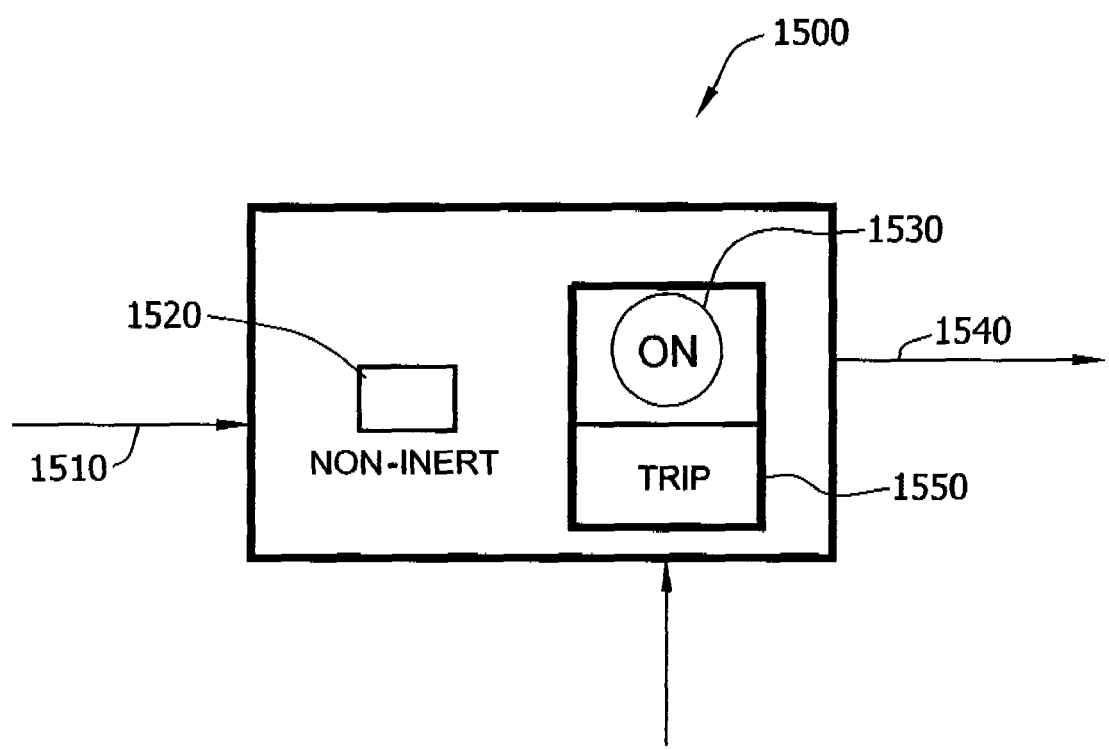
FIG. 15 is a schematic illustration of an exemplary user interface used with the system shown in FIG. 12.

FIG. 15 is a schematic illustration of a user interface 1500 used with system 1200 shown in FIG. 12. More specifically and in the exemplary embodiment, processor 1292 is communicatively coupled to user interface 1500. In the exemplary embodiment, processor 1292 transmits a signal 1510 to user interface 1500 to notify an operator if ullage gas 1236 is within the non-inert region, as shown in FIGS. 4, 5 and 6. As described herein, to determine ullage inert/non-inert status, processor 1292 compares $T_{ullage}$ with ST and generates signal 1510 when $T_{ullage}$ is greater than ST. System controller 1220 then transmits signal 1510 to user interface 1500. This signal illuminates indicator 1520 to facilitate advising, cautioning, and/or warning the operator. The above condition indicates that the ullage may be non-inert based on the pre-established criteria. Transmission of signal 1510 stops when $T_{ullage}$ is equal to or less than ST. The above condition indicates that ullage gas 1236 in ullage region 1234 is inert based on pre-established criteria. Indicator 1520, if previously illuminated, extinguishes based on an inert ullage (i.e., safe) determination.

User interface 1500 includes a manual switch 1530 for manually selecting system 1200. When switch 1530 is in an ON configuration, a signal 1540 is provided to system controller 1220. Signal 1540 commands system controller 1220 to select activate system 1200. System 1200 operates automatically, without any crew interaction, once selected. In the exemplary embodiment, user interface 1500 includes an advisory indicator 1550 illuminates when UCM 1202 fails or malfunctions. The failure or malfunction of system 1200 is detected by temperature sensor 1290. Temperature sensor 1290 data is substantially continuously compared with a pre-programmed temperature threshold, $T_{trip}$ by system controller 1220. If the temperature detected by sensor 1290 exceeds the programmed temperature threshold $T_{trip}$ then processor 1292 deactivates electric motor 1224 as described herein. Processor 1292 sends signal 1545 to illuminate advisory indicator 1550. In the exemplary embodiment, electric motor 1224 remains deactivated until the operator recycles (turn OFF and then ON) manual switch 1530. Ullage cooling machine (UCM) 1202 resets and starts operating if the condition that caused the deactivation does not exist.

As ullage gas 1236 progressively decreases in temperature, the fuel air ratio decreases and ullage gas 1236 increasingly becomes inert during UCM 1202 operation. In the exemplary embodiment, when temperature of ullage gas 1236 is equal to or less than the Safe Temperature 1410, the ullage gas 1236 is inert, i.e. non-combustible. The cooling process described herein continues until system controller 1220 determines the ullage temperature $T_{ullage}$ is equal to or less than motor stop temperature $T_{stop}$ 1430 and commands motor controller 1222 to shut down electric motor 1224. When the above condition is satisfied the temperature $T_{ullage}$ of ullage gas 1236 is at a temperature lower than ST 1410 and the ullage gas is determined to be inert.

Figure 16:
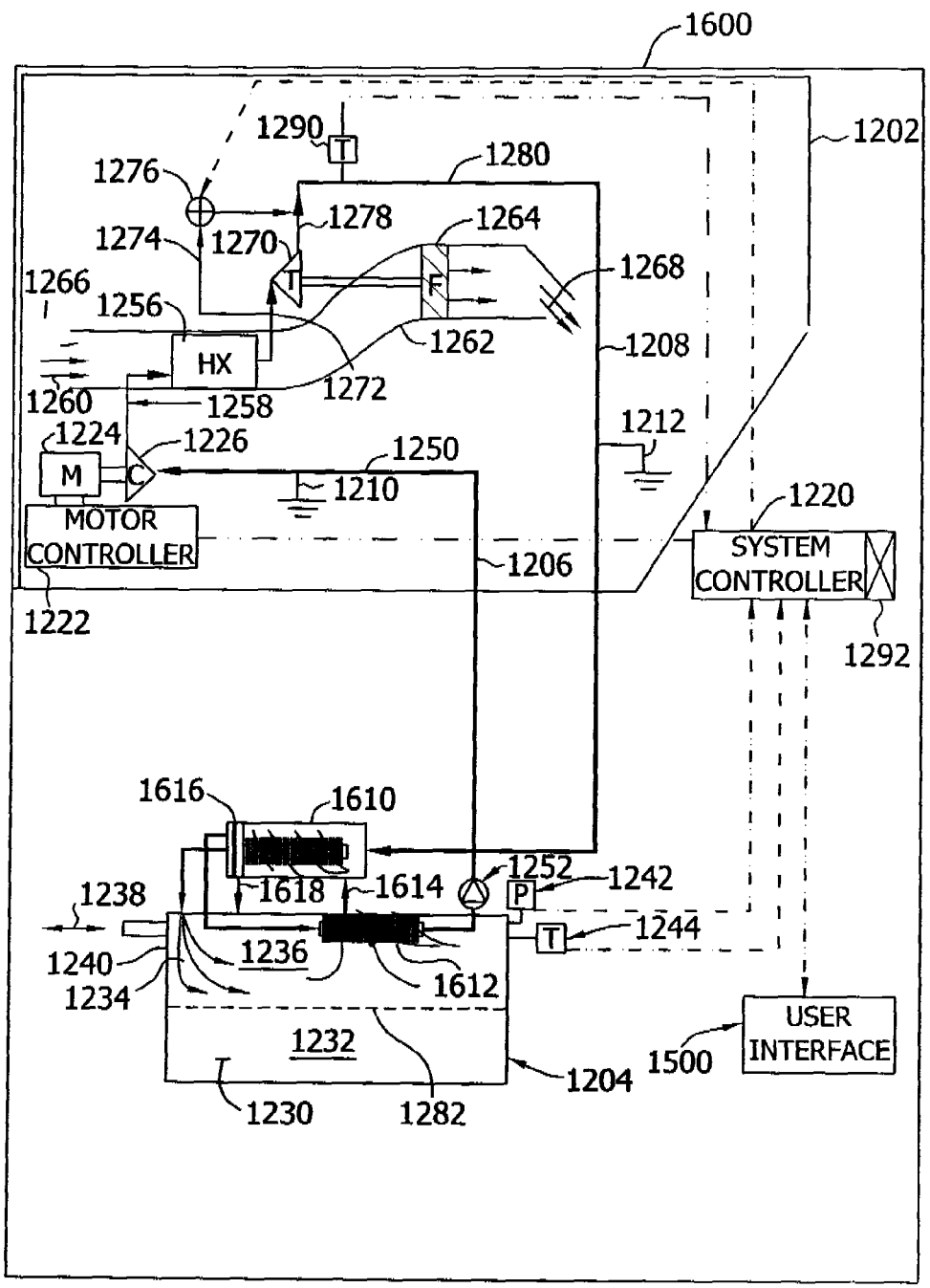
FIG. 16 is a schematic illustration of an alternative embodiment of a system used to make a fuel tank inert.

FIG. 16 is a schematic illustration of an alternate system 1600 used to make a fuel tank inert. The operation of system 1600 is similar to system 1200 shown in FIG. 12 and described herein. Therefore, like components are similarly numbered therein. System 1600 is similar to the embodiment illustrated in FIG. 12, but incorporates an ullage gas precooler 1610 and an ullage gas reheater 1612 to reduce the fuel vapor content of ullage gas 1236 processed by UCM 1202. In the exemplary embodiment, precooler 1610 is a heat exchanger that facilitates reducing a temperature of ullage gas 1236 that is channeled to compressor 1226 via chilled "wet" ullage gas 1280 returning from UCM 1202 as described herein. In this exemplary cooling process, some of the fuel vapors present in the withdrawn ullage gas condense as fuel droplets and are removed in the coalescer 1616. Reduced fuel vapor cool ullage gas flows to the reheater 1612 where it is heated by ullage gas 1236. In the exemplary embodiment, reheater 1612 is a heat exchanger that facilitates increasing a temperature of a reduced fuel vapor ullage gas 1236 discharged by precooler 1610 using warm ullage gas 1236 flowing to precooler 1610, as described in more detail herein.

In the illustrated embodiment, compressor 1226 of ullage cooling machine 1202 withdraws a quantity of ullage gas 1236 from ullage region 1234 of fuel tank 1204 via a conduit 1614. Ullage gas 1236 is channeled through reheater 1612 and transfers heat to the low fuel vapor ullage gas returning to precooler 1610 from coalescer 1616 via conduit 1614. Partially cooled ullage gas 1236 transfers heat to chilled "wet" ullage gas 1280 returning from UCM 1202. During this exemplary cooling process occurring within precooler 1610, a portion of the fuel vapors present in withdrawn ullage gas 1236 condense as liquid fuel. In the exemplary embodiment, system 1600 includes a coalescer 1616 positioned downstream of the precooler 1610 that removes this condensed liquid fuel from pre-cooled ullage gas 1236. The condensed fuel is channeled back into fuel tank via a drain conduit 1618. The fuel vapor content (fuel air ratio) of withdrawn ullage gas 1236 is reduced. Precooled reduced fuel vapor ullage gas 1236 flows from the coalescer 1616 into reheater 1612 wherein it is heated by ullage gas 1236 that flows into precooler 1610 via conduit 1614. Warm ullage gas of low fuel vapor concentration is channeled to compressor 1226 via conduit 1206. Chilled "wet" ullage gas 1280 returning from UCM 1202 is channeled through precooler 1610 via conduit 1208 wherein chilled "wet" ullage gas 1280 absorbs heat from ullage gas 1236 withdrawn by compressor 1226 and is returned to fuel tank 1204 wherein ullage gas 1236 mixes with ullage gas 1236 within the ullage region 1234. As shown in FIG. 16 and in the exemplary embodiment, a portion of the fuel vapor is condensed in the precooler 1610 and removed in coalescer 1616 prior to processing ullage gas within UCM 1202 as described herein. System 1600 facilitates reducing a temperature and fuel vapor concentration of ullage gas processed by UCM 1202.

Exemplary embodiments of fuel tank inerting systems are described in detail above. The above-described systems that are used to make a fuel tank inert reduce temperatures of the ullage gas and fuel in the fuel tank. The temperature of the ullage is reduced and maintained below the safe temperature, which is equal to or lower than the fuel's lower flammability limit. This ensures that the ullage is maintained within the inert region as described herein. To reduce flammability, the methods described herein use fuel properties (flash point temperature), lower flammability limit (LFL), a variation of LFL with fuel tank pressure or altitude, a fuel vapor condensation at low temperature, and/or a further reduction of fuel vapor pressure with decrease in fuel temperature.

Moreover, the system and methods described herein overcome many of the deficiencies realized in a nitrogen-based fuel tank inerting type system. In contrast to fuel tank inerting systems, the system size depends only upon the parameters that cause the inerting issues, i.e. heat input, fuel tank heat transfer characteristics and fuel-tank pressure change and does not depend on fuel tank volume as is the case with the inerting systems. Additionally, aircraft descent rate does not impact system design as it may do in an inerting system. For example, during descent, outside ambient air enters a vented fuel tank to re-pressurize the fuel tank. At high altitudes outside air is at temperatures substantially lower than the safe temperature (ST) and may supplement fuel tank cooling. Furthermore, the system and methods described herein require no engine bleed-air as feedstock as is required by an on-board inert gas (nitrogen enriched air) generating system. As such, the system has substantially high efficiency compared to an inerting system. The system requires only electrical power for its operation, and requires no major changes to existing systems and re-certification of existing systems. Therefore, non-recurring costs of the disclosed systems may be substantially lower compared to inerting systems, which require changes to the engine bleed-air system, air-conditioning system ram-air system, and/or duct leak detection system.

Although the foregoing description contains many specifics, these should not be construed as limiting the scope of the present disclosure, but merely as providing illustrations of some of the presently preferred embodiments. Similarly, other embodiments may be devised which do not depart from the spirit or scope of the present disclosure. Features from different embodiments may be employed in combination. The scope of the disclosure is, therefore, indicated and limited only by the appended claims and their legal equivalents, rather than by the foregoing description. All additions, deletions and modifications as disclosed herein which fall within the meaning and scope of the claims are to be embraced thereby.

Although the apparatus and methods described herein are described in the context of enhancing safety levels by making ullage regions within aircraft fuel tanks inert, it is understood that the apparatus and methods are not limited to aerospace applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to support the claims, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel tank safety system comprising:
   an ullage cooling assembly coupled in flow communication with a vehicle fuel tank, the fuel tank comprising a fuel region including a quantity of fuel, and an ullage region including a quantity of ullage gas, said ullage cooling assembly comprising:
   a compressor configured to extract a quantity of ullage gas from the vehicle fuel tank;
   a heat exchanger coupled in flow communication downstream of said compressor, said heat exchanger configured to receive the quantity of ullage gas from the compressor and reduce a temperature of the ullage gas;
   a turbine coupled in flow communication downstream of said heat exchanger, said turbine configured to further reduce the temperature of the ullage gas and facilitate channeling the ullage gas to the fuel tank;
   a system controller operatively coupled to said ullage cooling assembly, said system controller configured to transmit to said ullage cooling assembly one of a start signal to activate ullage cooling assembly or a stop signal to deactivate ullage cooling assembly.

2. A system in accordance with claim 1, wherein said heat exchanger comprises an inlet configured to extract a quantity of cooling air from a surrounding atmosphere to facilitate reducing the temperature of the ullage gas.

3. A system in accordance with claim 1 further comprising a user interface operatively coupled to said system controller, said user interface comprising a switch configured to manually activate and deactivate said ullage cooling assembly.

4. A system in accordance with claim 1 further comprising:
   a temperature sensor communicatively coupled to said system controller, said temperature sensor configured for temperature measurement of the ullage region; and
   a pressure sensor communicatively coupled to said system controller, said pressure sensor configured to measure a pressure within the fuel tank.

5. A system in accordance with claim 4 further comprising:
   a motor operatively coupled to said compressor, said motor configured to drive said compressor; and a motor controller coupled to said motor and in communication with said system controller, said motor controller configured to operate said motor based on a signal received from said system controller.

6. A system in accordance with claim 1 wherein said system controller comprises a processor programmed to:
receive data from said pressure sensor and said temperature sensor;
determine a safe temperature of the fuel tank based on the pressure within the fuel tank;
compare the temperature of the ullage region and the temperature of the fuel region with a chiller start temperature and a chiller stop temperature;
transmit an activation signal to said motor controller if the temperature of the ullage region is greater than the chiller start temperature; and
transmit a de-activation signal to said motor controller if the temperature of the ullage region is less than or equal to the chiller stop temperature.

7. A system in accordance with claim 6 further comprising an advisory indicator, and wherein said processor is further programmed to transmit an activation signal to said user interface to activate said advisory indicator if the temperature of the ullage region is greater than the safe temperature.

8. A system in accordance with claim 1 further comprising:
a precooler coupled in flow communication with said fuel tank, said precooler configured to receive a flow of reduced temperature ullage gas from said ullage cooling assembly and facilitate reducing a temperature of the quantity of ullage gas extracted by said compressor;
a coalescer coupled in flow communication with said precooler, said coalescer configured to receive a flow of ullage gas including a quantity of condensed fuel vapor from the precooler and facilitate substantially removing the quantity of condensed fuel vapor, producing a quantity of reduced fuel vapor ullage gas; and
a reheater coupled downstream of said coalescer, said reheater configured to increase a temperature of the quantity of reduced fuel vapor ullage gas.

9. A vehicle comprising:
a fuel tank comprising a fuel region including a quantity of fuel, and an ullage region including a quantity of ullage gas; and
a fuel tank safety system operatively coupled to said fuel tank, said fuel tank safety system comprising:
an ullage cooling assembly coupled in flow communication with a vehicle fuel tank, the fuel tank comprising a fuel region including a quantity of fuel, and an ullage region including a quantity of ullage gas, said ullage cooling assembly comprising:
a compressor configured to extract a quantity of ullage gas from the vehicle fuel tank;
a heat exchanger coupled in flow communication downstream of said compressor, said heat exchanger configured to receive the quantity of ullage gas from the compressor and reduce a temperature of the ullage gas;
a turbine coupled in flow communication downstream of said heat exchanger, said turbine configured to further reduce the temperature of the ullage gas and facilitate channeling the ullage gas to the fuel tank;
a system controller operatively coupled to said ullage cooling assembly, said system controller configured to transmit to said ullage cooling assembly one of a start signal to activate ullage cooling assembly or a stop signal to deactivate ullage cooling assembly.

10. A vehicle in accordance with claim 9, wherein the extracted fluid is at least one of a quantity of fuel or a quantity of ullage gas.

11. A vehicle in accordance with claim 10 wherein said heat exchanger comprises an inlet configured to extract a quantity of cooling air from a surrounding atmosphere to facilitate reducing the temperature of the ullage gas.

12. A vehicle in accordance with claim 9 further comprising a user interface operatively coupled to said system controller, said user interface comprising a switch configured to manually activate and deactivate said ullage cooling assembly.

13. A vehicle in accordance with claim 9 further comprising:
a temperature sensor communicatively coupled to said system controller, said temperature sensor configured for temperature measurement of the ullage region; and
a pressure sensor communicatively coupled to said system controller, said pressure sensor configured to measure a pressure within the fuel tank.

14. A system in accordance with claim 13 wherein said system controller comprises a processor programmed to:
receive data from said pressure sensor and said temperature sensor;
determine a safe temperature of the fuel tank based on the pressure within the fuel tank;
compare the temperature of the ullage region and the temperature of the fuel region with a chiller start temperature and a chiller stop temperature;
transmit an activation signal to said motor controller if the temperature of the ullage region is greater than the chiller start temperature or the temperature of the fuel region is greater that the chiller start temperature; and
transmit a de-activation signal to said motor controller if the temperature of the ullage region is less than or equal to the chiller stop temperature.

15. A vehicle in accordance with claim 9 further comprising an advisory indicator, and wherein said processor is further programmed to transmit an activation signal to said user interface to activate said advisory indicator if the temperature of the ullage region is greater than the safe temperature.

16. A vehicle in accordance with claim 9 further comprising:
a precooler coupled in flow communication upstream of said fuel tank, said precooler configured to received a flow of reduced temperature ullage gas from said ullage cooling assembly and facilitates reducing a temperature thereof; and
a reheater coupled within said fuel tank downstream of said precooler, said reheater configured to increase a temperature of a quantity of reduced fuel vapor ullage gas extracted from said precooler.

17. A system in accordance with claim 16 further comprising a coalescer coupled in flow communication with said precooler, said coalescer configured to receive a flow of ullage gas including a quantity of condensed fuel vapor from the precooler and facilitate substantially removing the quantity of condensed fuel vapor, producing a quantity of reduced fuel vapor ullage gas.

* * * * *